United States Patent
Lee et al.

(10) Patent No.: US 9,542,152 B2
(45) Date of Patent: Jan. 10, 2017

(54) SYSTEM-ON-CHIP AND APPLICATION PROCESSOR INCLUDING FIFO BUFFER AND MOBILE DEVICE COMPRISING THE SAME

(71) Applicants: Donghan Lee, Seongnam-si (KR); Jaesop Kong, Gwacheon-si (KR); Keemoon Chun, Seongnam-si (KR)

(72) Inventors: Donghan Lee, Seongnam-si (KR); Jaesop Kong, Gwacheon-si (KR); Keemoon Chun, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 465 days.

(21) Appl. No.: 14/086,083

(22) Filed: Nov. 21, 2013

(65) Prior Publication Data

US 2014/0149694 A1    May 29, 2014

(30) Foreign Application Priority Data

Nov. 27, 2012  (KR) .................. 10-2012-0135383

(51) Int. Cl.
 *G06F 3/00* (2006.01)
 *G06F 5/00* (2006.01)
 *G06F 5/12* (2006.01)

(52) U.S. Cl.
 CPC ........... *G06F 5/12* (2013.01); *G06F 2205/062* (2013.01); *G06F 2205/126* (2013.01)

(58) Field of Classification Search
 None
 See application file for complete search history.

(56) References Cited

U.S. PATENT DOCUMENTS

| | | | | |
|---|---|---|---|---|
| 5,262,996 A | | 11/1993 | Shiue | |
| 5,537,128 A | * | 7/1996 | Keene | G09G 3/3644 345/531 |
| 5,959,932 A | * | 9/1999 | MacLellan | G11C 8/16 365/189.05 |
| 6,092,128 A | * | 7/2000 | Maas | H04L 12/46 365/221 |
| 6,301,264 B1 | * | 10/2001 | Holm | G06F 13/4018 341/103 |
| 6,480,942 B1 | | 11/2002 | Hirairi | |

(Continued)

FOREIGN PATENT DOCUMENTS

| | | |
|---|---|---|
| JP | 2830931 | 9/1998 |
| JP | 2007272562 | 10/2007 |

(Continued)

*Primary Examiner* — Elias Mamo
(74) *Attorney, Agent, or Firm* — Onello & Mello LLP

(57) ABSTRACT

A system-on-chip is provided which includes a data producer; a FIFO buffer which stores data transferred from the data producer at a memory area corresponding to a write pointer; a first consumer which pops data of a memory area corresponding to a first read pointer of the FIFO buffer out; and a second consumer which pops data of a memory area corresponding to a second read pointer of the FIFO buffer out. The FIFO buffer requests a pop-out operation at the second consumer according to the difference between the write pointer and the first read pointer or overwrites data provided from the data producer at a memory area corresponding to the second read pointer.

18 Claims, 19 Drawing Sheets

(56) References Cited

U.S. PATENT DOCUMENTS

| | | | |
|---|---|---|---|
| 6,571,301 B1* | 5/2003 | Nakahara | G06F 5/14 710/31 |
| 6,853,588 B2 | 2/2005 | Kim et al. | |
| 7,623,395 B2 | 11/2009 | Nishigaki | |
| 2003/0034797 A1* | 2/2003 | Bentz | G06F 5/10 326/38 |
| 2005/0062745 A1* | 3/2005 | Amemiya | G06F 3/14 345/501 |
| 2008/0034169 A1 | 2/2008 | Trask et al. | |
| 2011/0119415 A1* | 5/2011 | Miyasaka | G06K 15/02 710/57 |
| 2013/0343439 A1* | 12/2013 | Wentroble | H03M 13/175 375/219 |

FOREIGN PATENT DOCUMENTS

| | | |
|---|---|---|
| JP | 4481458 | 3/2010 |
| KR | 1020040059013 | 7/2004 |

* cited by examiner

SYSTEM-ON-CHIP AND APPLICATION PROCESSOR INCLUDING FIFO BUFFER AND MOBILE DEVICE COMPRISING THE SAME

CROSS-REFERENCE TO RELATED APPLICATIONS

A claim for priority under 35 U.S.C. §119 is made to Korean Patent Application No. 10-2012-0135383 filed Nov. 27, 2012, in the Korean Intellectual Property Office, the entire contents of which are hereby incorporated by reference.

BACKGROUND

Exemplary embodiments in accordance with principles of inventive concepts relate to a FIFO buffer.

The use of mobile devices, such as smart phones, tablet PCs, digital cameras, and MP3 players, for example, has expanded greatly in recent years. One reason for the explosive increase in use of such devices is that they have all increased greatly in functionality. That increase in functionality is due, in no small measure, to the increased usage of "system-on-chip" (hereinafter referred to as a SoC). An SoC may include various functional blocks such as: a DMA (Direct Memory Access), an UART (Universal Asynchronous Receiver/Transmitter), an RCV (Remocon Receiver), and a display controller, for example. Such functional blocks may transfer data through a FIFO (First-In-First-Out) buffer and a chip, or SoC, may include plural FIFO buffers for various purposes.

In a mobile device, a plurality of consumers (also referred to herein as data-consuming functional blocks, or, simply, as data-users) may exist with respect to the same data to play one content. For example, when image data generated the data may be simultaneously output and backed up. For example, a frame generated when a moving picture is processed may be simultaneously provided to a display controller for playing and a DMA module for a transfer to a backup memory.

Frame data for a transfer to the display controller for playing and frame data for a transfer to the DMA module may be stored in FIFO memories, for example. However, data consumption speeds and patterns of use may be different for different functional blocks. For example, a delay in providing a frame to a display may cause such a critical problem that it is impossible to play contents and, as a result, frame data provided for time-critical (for example, real time), use may be quickly transferred. On the other hand, data provided for backup may experience delays without critically affecting operations and, as a result, data transfer rates for non-real-time operations, such as backup operations, may be lower than that for real-time operations, such as display.

With ever-increasing demands for functionality, there may be a concomitant demand for an increased number of FIFO buffers in an SoC. However, an increase in the number of FIFO buffers could increase power consumption and increase the volume of the SoC. Such potential problems may become particularly acute with the increased use of multimedia data, for example.

SUMMARY

In exemplary embodiments in accordance with principles of inventive concepts, a system-on-chip includes a data producer; a FIFO buffer which stores data transferred from the data producer at a memory area corresponding to a write pointer; a first consumer which pops out data of a memory area corresponding to a first read pointer of the FIFO buffer; and a second consumer which pops out data of a memory area corresponding to a second read pointer of the FIFO buffer, wherein the FIFO buffer requests a pop-out operation at the second consumer according to the difference between the write pointer and the first read pointer or overwrites data provided from the data producer at a memory area corresponding to the second read pointer.

In exemplary embodiments in accordance with principles of inventive concepts, the first consumer is a functional block consuming data in real time and the second consumer consumes data in non-real time.

In exemplary embodiments in accordance with principles of inventive concepts, if the difference between the second read pointer and the write pointer corresponds to the size of the FIFO buffer and the difference between the first read pointer and the write pointer is less than a first threshold value, the FIFO buffer overwrites data from the data producer at a memory area corresponding to the second read pointer.

In exemplary embodiments in accordance with principles of inventive concepts, wherein the FIFO buffer informs the second consumer that the overwritten data is invalid data.

In exemplary embodiments in accordance with principles of inventive concepts, wherein if the difference between the second read pointer and the write pointer corresponds to the size of the FIFO buffer and the difference between the first read pointer and the write pointer is more than a first threshold value and less than a second threshold value, the FIFO buffer request a pop-out operation by the second consumer.

In exemplary embodiments in accordance with principles of inventive concepts, wherein the FIFO buffer requests that the data producer stops generating data.

In exemplary embodiments in accordance with principles of inventive concepts, wherein the FIFO buffer comprises: a memory which has an input port receiving data provided from the data producer and a plurality of output ports outputting data to the first and second consumers; and FIFO control logic which generate the write pointer and the first and second read pointers and determines the status of the FIFO buffer related to the first and second consumers by referring to the write pointer and the first and second read pointers.

In exemplary embodiments in accordance with principles of inventive concepts, wherein if the difference between the second read pointer and the write pointer corresponds to the size of the FIFO buffer and the difference between the first read pointer and the write pointer is less than a first threshold value, the FIFO control logic controls the memory to forcibly overwrite data from the data producer at a memory area corresponding to the second read pointer.

In exemplary embodiments in accordance with principles of inventive concepts, wherein if the difference between the second read pointer and the write pointer corresponds to the size of the FIFO buffer and the difference between the first read pointer and the write pointer is more than a first threshold value and less than a second threshold value, the FIFO control logic generates a flag signal requesting a pop-out operation of the second consumer.

In exemplary embodiments in accordance with principles of inventive concepts, wherein the FIFO control logic comprises: a write pointer generator which generates a write pointer in response to data push from the data producer; a first read pointer generator which generates a first read pointer in response to a pop-out request of the first consumer; a second read pointer generator which generates a second read pointer in response to a pop-out request of the second consumer; a status generator which decides a status of the memory in response to the write pointer and the first and second read pointers; and a flag generator which transfers a flag to at least one of the data producer and the first and second consumers in response to a status of a multi-port memory output from the status generator.

In exemplary embodiments in accordance with principles of inventive concepts, an application processor includes: a data producer; a FIFO buffer which sequentially stores data provided from the data producer; a plurality of main consumers each of which pops out data stored at the FIFO buffer; and a plurality of sub consumers each of which pops out data stored at the FIFO buffer and allows a pop-out delay, wherein the FIFO buffer requests a pop-out operation on at least one of the sub consumers before data to be output to at least one of the main consumers is exhausted.

In exemplary embodiments in accordance with principles of inventive concepts, wherein if the difference between a write pointer and at least one of read pointers each corresponding to the main consumers is less than a first threshold value, the FIFO buffer overwrites data pushed from the data producer at a data area not popped out by the sub consumers.

In exemplary embodiments in accordance with principles of inventive concepts, wherein if the difference between a write pointer and at least one of read pointers each corresponding to the main consumers is more than the first threshold value and less than a second threshold value, the FIFO buffer provides at least one of the sub consumers with a flag signal requesting a pop-out operation.

In exemplary embodiments in accordance with principles of inventive concepts, wherein the FIFO buffer informs at least one of the sub consumers that the overwritten data is invalid data.

In exemplary embodiments in accordance with principles of inventive concepts, wherein the FIFO buffer comprises: a memory which writes data provided from the data producer at a write pointer and outputs according to read pointers each read pointer corresponding to main and sub consumers; and FIFO control logic which determines a data status of the FIFO buffer referring to the write pointer and the read pointers.

In exemplary embodiments in accordance with principles of inventive concepts, wherein the FIFO control logic comprises: a register which stores the first threshold value or the second threshold value; a plurality of first comparators which compare differences of the write pointer and read pointers each corresponding to the main consumers with the first threshold value or the second threshold value and determine statuses of the FIFO buffer on the main consumers; a plurality of second comparators which compare differences of the write pointer and read pointers each corresponding to the sub consumers with the first threshold value or the second threshold value and determine statuses of the FIFO buffer on the sub consumers; and a sub consumer hurry generator which outputs a hurry flag directing data consumption to at least one of the sub consumers when at least one of the sub consumers is determined to be at a full status based on outputs of the first and second comparators and the difference between the write point and a read pointer corresponding to at least one of the main consumers is less than the second threshold value.

In exemplary embodiments in accordance with principles of inventive concepts, wherein the FIFO control logic comprises: a producer hurry generator which requests data to be overwritten at a data area not popped out by the at least one sub consumer at the data producer when at least one of the sub consumers is determined to be at a full status based on outputs of the first and second comparators and the difference between the write point and a read pointer corresponding to at least one of the main consumers is less than the first threshold value.

In exemplary embodiments in accordance with principles of inventive concepts, wherein the FIFO control logic further comprises: a dirty handler which informs the at least one sub consumer that the overwritten data is invalid.

In exemplary embodiments in accordance with principles of inventive concepts, a mobile device includes: a hardware codec which generates image data; a FIFO buffer which has a circular buffer architecture and stores the image data at a memory location corresponding to a write pointer and outputs the stored data based on a first read pointer and a second read pointer; a display controller which plays an image on a display using data popped out by the first read pointer; and a direct memory access control unit which is provided with data popped out by the second read pointer.

In exemplary embodiments in accordance with principles of inventive concepts, wherein if the difference between the write pointer and the first read pointer is less than a first threshold value, the FIFO buffer overwrites data pushed from the hardware codec regardless of a location of the second read pointer.

In exemplary embodiments in accordance with principles of inventive concepts, wherein the FIFO buffer informs the direct memory access control unit that the overwritten data is invalid data.

In exemplary embodiments in accordance with principles of inventive concepts, wherein if the difference between the write pointer and the first read pointer is more than the first threshold value and less than a second threshold value, the FIFO buffer requests that the direct memory access control unit pops data out.

In exemplary embodiments in accordance with principles of inventive concepts, wherein the difference between the write pointer and the second read pointer corresponds to the size of the FIFO buffer.

In exemplary embodiments in accordance with principles of inventive concepts, wherein the first and second threshold values are decided according to an increasing speed of the first read pointer.

In exemplary embodiments in accordance with principles of inventive concepts, wherein the direct memory access control unit provides a memory for backup with data popped out in response to the second read pointer.

In exemplary embodiments in accordance with principles of inventive concepts, an electronic device includes: an electronic memory; and electronic memory control logic to operate the electronic memory as a circular first in first out (FIFO) buffer to receive data from a data producer and to provide data to a plurality of prioritized data consumers, the control logic providing data to data consumers at substantially independent rates.

In exemplary embodiments in accordance with principles of inventive concepts, wherein the memory control logic is configured to control the location to which a data producer pushes data to the memory by a write pointer under which the memory control logic updates.

In exemplary embodiments in accordance with principles of inventive concepts, wherein the memory control logic is configured to control the provision of to first and second data consumers as indicated by respective first and second read pointers updated by the memory control logic.

In exemplary embodiments in accordance with principles of inventive concepts, wherein the memory control logic is configured to provide data to the first data consumer at a higher priority than to the second data consumer.

In exemplary embodiments in accordance with principles of inventive concepts, wherein the memory control logic is configured to monitor the distance between the locations of the write pointer and first and second read pointers.

In exemplary embodiments in accordance with principles of inventive concepts, wherein the memory control logic is configured to detect when the distance between the write pointer and read pointer associated with higher priority data consumer reaches a threshold value.

In exemplary embodiments in accordance with principles of inventive concepts, wherein the memory control logic is configured to issue an interrupt signal when the distance between the write pointer and read pointer associated with the higher priority data consumer reaches a threshold value.

In exemplary embodiments in accordance with principles of inventive concepts, wherein the memory control logic is configured to overwrite data that has been popped to the higher priority data consumer but not to the lower priority data consumer when an interruption of supply of data to the higher priority data consumer is threatened.

In exemplary embodiments in accordance with principles of inventive concepts, wherein the memory control logic is configured to determine that an interruption of supply of data to the higher priority data consumer is threatened when the write pointer is within a threshold distance of the read pointer associated with the higher priority data consumer.

In exemplary embodiments in accordance with principles of inventive concepts, wherein the memory control logic is configured to alert the lower priority data consumer that it has overwritten data that had not been popped out to the lower priority data consumer.

In exemplary embodiments in accordance with principles of inventive concepts, wherein the electronic device comprises a system-on-a-chip.

In exemplary embodiments in accordance with principles of inventive concepts, wherein the electronic device comprises a mobile electronic device and the data producer is a hardware codec that generates image data; the higher priority data consumer is a display controller that plays an image on a display using data popped out by the first read pointer; and the lower priority data consumer is a direct memory access control unit that is provided with data popped out by the second read pointer.

In exemplary embodiments in accordance with principles of inventive concepts, wherein if the difference between the write pointer and the first read pointer is less than a first threshold value, the FIFO buffer overwrites data pushed from the hardware codec regardless of a location of the second read pointer.

In exemplary embodiments in accordance with principles of inventive concepts, wherein the FIFO buffer informs the direct memory access control unit that the overwritten data is invalid data.

In exemplary embodiments in accordance with principles of inventive concepts, wherein if the difference between the write pointer and the first read pointer is more than the first threshold value and less than a second threshold value, the FIFO buffer requests that the direct memory access control unit pops data out.

In exemplary embodiments in accordance with principles of inventive concepts, wherein the difference between the write pointer and the second read pointer corresponds to the size of the FIFO buffer.

In exemplary embodiments in accordance with principles of inventive concepts, wherein the first and second threshold values are decided according to an increasing speed of the first read pointer.

In exemplary embodiments in accordance with principles of inventive concepts, wherein the direct memory access control unit provides a memory for backup with data popped out in response to the second read pointer.

One aspect of embodiments of the inventive concept is directed to provide a system-on-chip comprising a data producer; a FIFO buffer which stores data transferred from the data producer at a memory area corresponding to a write pointer; a first consumer which pops data of a memory area corresponding to a first read pointer of the FIFO buffer out; and a second consumer which pops data of a memory area corresponding to a second read pointer of the FIFO buffer out, wherein the FIFO buffer requests a pop-out operation at the second consumer according to a difference between the write pointer and the first read pointer or overwrites data provided from the data producer at a memory area corresponding to the second read pointer.

Another aspect of embodiments of the inventive concept is directed to provide an application processor comprising a data producer; a FIFO buffer which sequentially stores data provided from the data producer; a plurality of main consumers each of which pops data stored at the FIFO buffer out; and a plurality of sub consumers each of which pops data stored at the FIFO buffer out and allows a pop-out delay, wherein the FIFO buffer requests a pop-out operation on at least one of the sub consumers before data to be output to at least one of the main consumers is exhausted.

Still another aspect of embodiments of the inventive concept is directed to provide a mobile device comprising a hardware codec which generates image data; a FIFO buffer which has a circular buffer architecture and stores the image data at a memory location corresponding to a write pointer and outputs the stored data based on a first read pointer and a second read pointer; a display controller which plays an image on a display using data popped out by the first read pointer; and a direct memory access control unit which is provided with data popped out by the second read pointer.

With embodiments of the inventive concept, although a FIFO buffer is shared by a plurality of consumers having different propensities to consume data, it may be driven without lowering of a service quality. Also, since status detection and actions are performed in the FIFO buffer using pointers, it is possible to quickly solve problems without intervention of software. Thus, it is possible to implement a light, thin and low-power system-on-chip and a mobile device including the same.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
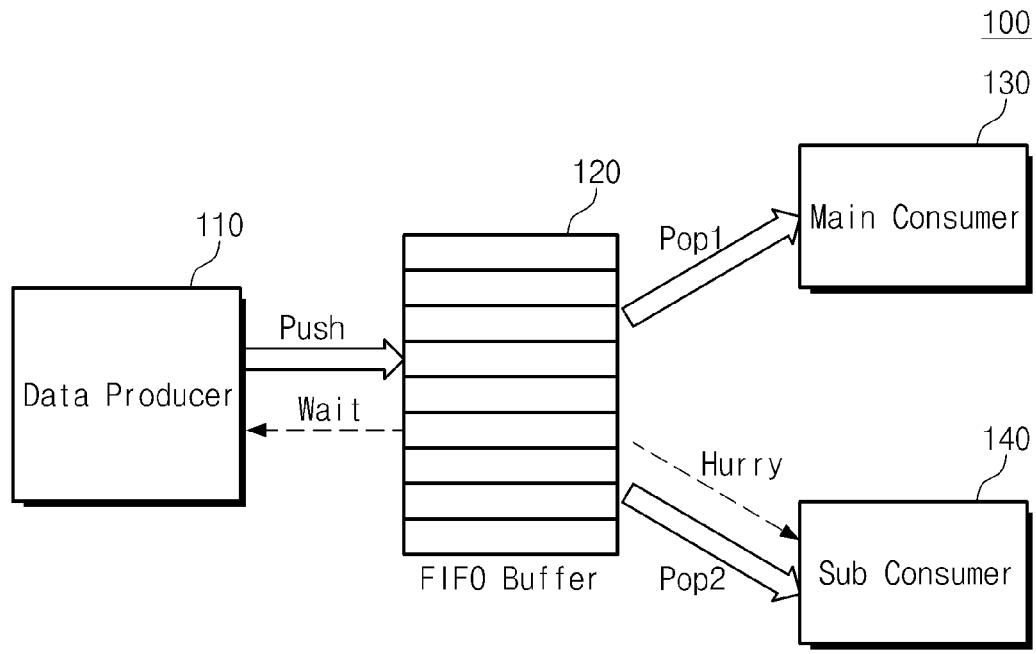
FIG. 1 is a block diagram schematically illustrating a system-on-chip in accordance with principles of inventive concepts.

Various exemplary embodiments will be described more fully hereinafter with reference to the accompanying drawings, in which exemplary embodiments are shown. Exemplary embodiments may, however, be embodied in many different forms and should not be construed as limited to exemplary embodiments set forth herein. Rather, these exemplary embodiments are provided so that this disclosure will be thorough, and will convey the scope of exemplary embodiments to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items. The term "or" is used in an inclusive sense unless otherwise indicated.

It will be understood that, although the terms first, second, third, for example. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Hereinafter, exemplary embodiments in accordance with principles of inventive concepts will be explained in detail with reference to the accompanying drawings.

FIG. 1 is a block diagram schematically illustrating a system-on-chip 100 in accordance with principles of inventive concepts. System-on-chip 100 may include a data producer 110, a FIFO buffer 120, a main consumer 130, and a sub consumer 140, for example.

The data producer 110 may provide data to the FIFO buffer 120. Data pushed by the data producer 110 may be written to a memory area corresponding to a write pointer WP of the FIFO buffer 120. The data producer 110 may be controlled by instructions such as contained in an application or an operating system and may be a processing unit formed of a single core or multiple cores, for example. The data producer 110 may be a hardware codec which decodes input image data to provide it to the consumers 130 and 140, for example.

In an exemplary embodiment in accordance with principles of inventive concepts, if the FIFO buffer 120 does not include an empty area (that is, it has no storage available), the data producer 110 may wait (that is, stop generation of data and stop a push operation). Waiting may be in response to a wait signal from the FIFO buffer 120 that is generated when there is no empty area within the FIFO. The FIFO buffer 120 may generate a request for data when it has storage available and the data producer 110 may generate data or perform a push operation in response to such a request.

The FIFO buffer 120 may store data pushed from the data producer 110 sequentially in a memory area. In an exemplary embodiment in accordance with principles of inventive concepts, data sequentially stored at the FIFO buffer 120 may be sequentially popped out from the memory to the main consumer 130 and may also be popped out sequentially to the sub consumer 140.

In an exemplary embodiment in accordance with principles of inventive concepts, the status of the memory area of the FIFO buffer 120 may be determined by a write pointer WP and a read pointer RP. The write pointer WP may correspond to a write location of data pushed from the data producer 110 and may sequentially update, which, in exemplary embodiments, involves incrementing, or increasing, whenever write data is received. In particular, the write pointer WP and the read pointer RP of the FIFO buffer 120 may increase according to a circular memory architecture. That is, if data is written at a last location of the memory area of the FIFO buffer 120, the write pointer WP may be returned to the first location of the memory area of the FIFO buffer 120 and the read pointer RP may increase similarly. In an exemplary embodiment in accordance with principles of inventive concepts, the write pointer WP may increase prior to the read pointer RP because, for example, pop-out may be performed by the read pointer RP after data is written at the FIFO buffer 120 according to the write pointer WP.

In an exemplary embodiment in accordance with principles of inventive concepts, a FIFO buffer 120 may include a plurality of read pointers RP, with one for each consumer, for example. In an exemplary embodiment in accordance with principles of inventive concepts, the location from which data is to be output to the main consumer 130 may be decided by a first read pointer RP1, the location from which data is to be output to the sub consumer 140 may be decided by a second read pointer RP2, and other read pointers may be assigned to other consumers. In an exemplary embodiment in accordance with principles of inventive concepts, a system-on-chip may include at least three consumers having different propensities to consume data and the FIFO buffer 120 controlled by three or more associated read pointers.

In an exemplary embodiment in accordance with principles of inventive concepts, a FIFO buffer 120 may be shared by a plurality of data-users, such as consumers 130 and 140, having different data-consumption characteristics. One data-user may require a rapid, uninterrupted supply of data from FIFO 120 (a time-critical user, such as real-time user, for example) and another may only require data intermittently at a relatively low-rate (a non-time-critical, such as a non-real-time user, for example), for example. By employing a single FIFO buffer 120 that can accommodate a plurality of data-users/consumers, each of which may have different data-consumption characteristics, an SoC 100 in accordance with principles of inventive concepts may consume less power and encompass a smaller volume than an SoC that employs a plurality of FIFO buffers, each dedicated to an individual data-consumer, for example. Additionally, a mobile electronic device in accordance with principles of inventive concepts such as may employ an SoC 100 in accordance with principles of inventive concepts may similarly be of lesser volume and consume less power than mobile electronic devices not employ SoC 100.

In exemplary embodiments in accordance with principles of inventive concepts, data may be contained within FIFO buffer 120 that is read by one user (for example, main consumer 130), but not by another user (for example, sub consumer 140). In such an embodiment, the first read pointer RP1 may update (for example, increment) as data is popped to main consumer 130, but the second read pointer PR2, would not update (for example, increment) reflecting the fact that data is not being popped to sub consumer 140. In exemplary embodiments in accordance with principles of inventive concepts, FIFO buffer 120 may check its status by monitoring variations in the write pointer WP and the read pointers RP1 and RP2, for example. The FIFO buffer 120 may generate a flag signal (e.g., Wait or Hurry) to arbitrate data push and pop-out operations of the data producer 110, the main consumer 130, and the sub consumer 140, for example.

In exemplary embodiments in accordance with principles of inventive concepts, FIFO buffer 120 may control data push and pop-out operations based on data consumption characteristics of the consumers 130 and 140. For example, as will be described in greater detail below, the FIFO buffer 120 may control a push operation of the data producer 110 and pop-out operations of the consumers 130 and 140 to continuously provide data to a main consumer 130 which has to be supplied with data in real time. In exemplary embodiments in accordance with principles of inventive concepts, FIFO buffer 120 may employ the write pointer WP and the read pointers RP1 and RP2 to determine when a critical error could occur and could take measures to avoid such an error. For example, a FIFO buffer 120 in accordance with principles of inventive concepts may employ write pointer WP and pointers RP1 and RP2 to anticipate that data supplied to main consumer 130 may become depleted and act to avoid such an occurrence without intervention of higher-level processes (for example, software and/or firmware) of the system-on-chip 100.

Figure 2:
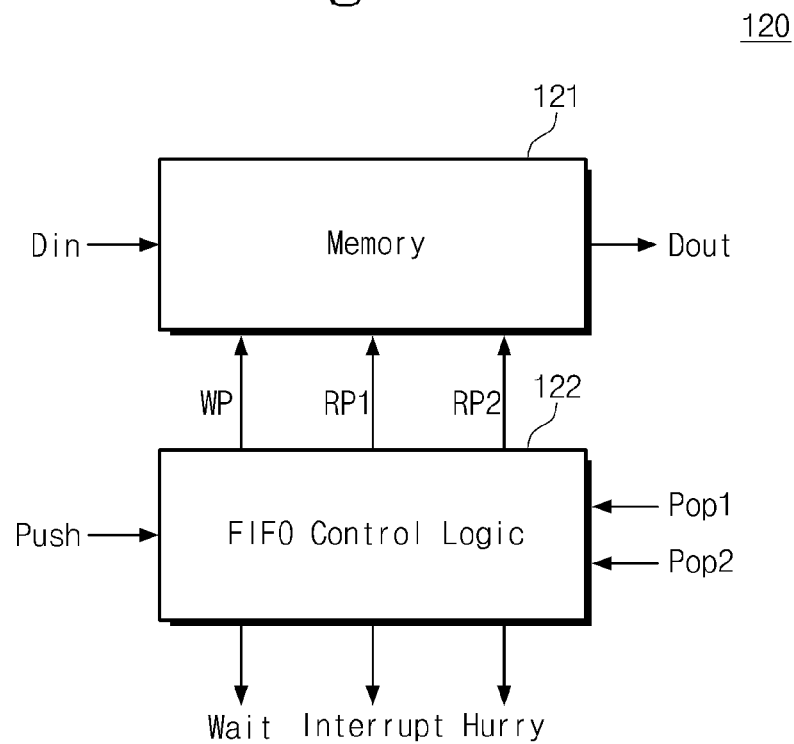
FIG. 2 is a block diagram schematically illustrating a FIFO buffer of FIG. 1.

FIG. 2 is a block diagram schematically illustrating an exemplary embodiment of FIFO buffer 120 in accordance with principles of inventive concepts. FIFO buffer 120 may include a memory 121 and FIFO control logic 122, for example. Memory 121 may write input data Din at a location corresponding to a write pointer WP. Data stored in the memory 121 may be output in response to read pointers RP1 and RP2, for example. The memory 121 may provide data to consumers, according to read pointers RP1 and RP2. In exemplary embodiments in accordance with principles of inventive concepts, the memory 121 may be formed of a high-speed SRAM having an input port and a plurality of output ports.

The FIFO control logic 122 may generate the write pointer WP in response to a push signal Push from a data producer 110 (refer to FIG. 1). The FIFO control logic 122 may generate the read pointers RP1 and RP2 in response to pop-out signals Pop1 and Pop2 from a main consumer 130 and a sub consumer 140, for example. The FIFO control logic 122 may determine the memory status of the FIFO buffer 120 based on the pointers WP, RP1, and RP2, for example. In exemplary embodiments in accordance with principles of inventive concepts, the pointers WP, RP1, and RP2 may be generated based on the push signal Push and the pop-out signals Pop1 and Pop2. The push signal Push may be a write clock for writing data, and the pop-out signals Pop1 and Pop2 may be read clocks for reading data, for example.

In exemplary embodiments in accordance with principles of inventive concepts, FIFO buffer 120 may have four statuses. The first status may be a pseudo-main-full (PMF) stats, which indicates that the main consumer 130 is fully filled with data. A second status may be a pseudo-main-empty (PME) status which indicates that data to be provided to the main consumer 130 is not available, or does not exist. A third status may be a pseudo-sub-full (PSF) status which indicates that the FIFO buffer 120 is fully filled with data to be provided to the sub consumer 140. A fourth status may be a pseudo-sub-empty (PSE) status which indicates that the FIFO buffer 120 does not include data to be provided to the sub consumer 140 is not in the FIFO buffer 120 or is otherwise unavailable.

Figure 3:
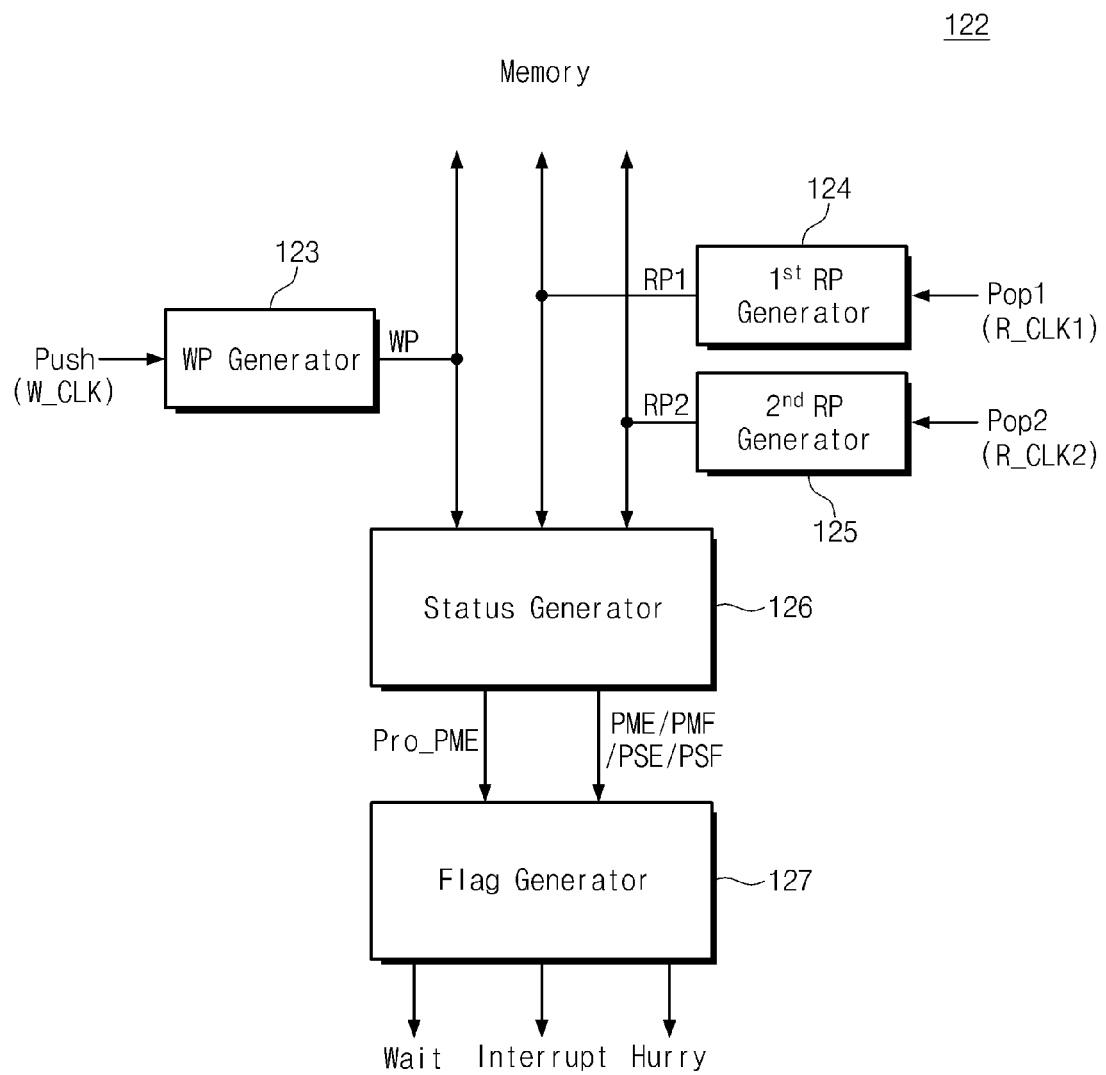
FIG. 3 is a block diagram schematically illustrating FIFO control logic of FIG. 2.

In exemplary embodiments in accordance with principles of inventive concepts, FIFO control logic 122 may determine the status of the FIFO buffer 120 to anticipate and avoid errors that may otherwise occur when a plurality of consumers share a FIFO buffer 120. The FIFO control logic 122 may generate an interrupt signal INTERRUPT, a wait flag wait for temporarily stopping a data push operation of the data producer 110, and a hurry flag Hurry to accelerate at least one consumers' data pop-out operation. Such acceleration may be by initiating the pop-out directly in response to a Hurry flag, for example An exemplary embodiment of FIFO control logic 122 in accordance with principles of inventive concepts is illustrated in the block diagram of FIG. 3. In exemplary embodiments, FIFO control logic 122 may include a write pointer generator 123, read pointer generators 124 and 125, a status generator 126, and a flag generator 127.

The write pointer generator 123 may generate a write pointer WP in response to a push signal Push from a data producer 110. The push signal Push from the data producer 110 may be a write clock W_CLK which is provided in synchronization with an input of data, for example. The write pointer generator 123 may update (increment, for example) the write pointer WP of the memory 121 in response to the push signal Push. The write pointer WP generated from the write pointer generator 123 may be provided to the memory 121 and the status generator 126.

The first read pointer generator 124 may update/increment and output a read pointer RP, incremented by a particular value from a previous read pointer RP, in response to a pop-out signal Pop1 provided from a main consumer 130. The second read pointer generator 125 may update/increment and output a previous read pointer RP in response to a pop-out signal Pop2 provided from a sub consumer 140. Read pointers RP1 and RP2 may be provided to the memory 121 and the status generator 126, for example.

In exemplary embodiments in accordance with principles of inventive concepts, status generator 126 may determine the statuses of a FIFO buffer 120 related to the main consumer 130 and the sub consumer 140 by referring to values of the read pointers RP1 and RP2 and the write pointer WP. In exemplary embodiments in accordance with principles of inventive concepts, status generator 126 may determine that a pseudo-main-full status PMF status obtains when the first read pointer RP1 lags behind the write pointer WP by a number equal to the number of locations in the FIFO, thus indicating that the write pointer WP has written ahead of the read pointer RP1 by an amount equal to the size of the FIFO FIFO_SIZE, and the position of the second read pointer RP2, relative to the write pointer WP, indicates that the sub-related FIFO is neither full nor empty. The status generator 126 may determine that a pseudo-main-empty status PME status obtains when the value of the first read pointer RP1 reaches the value of the write pointer WP and the position of the second read pointer RP2, relative to the write pointer WP, indicates that the sub-related FIFO is neither full nor empty. The status generator 126 may determine that a pseudo-sub-full status PSF obtains when the second read pointer RP2 lags behind the write pointer WP by a number equal to the number of locations in FIFO FIFO_SIZE and the position of the first read pointer RP1, relative to the write pointer WP, indicates that the main-related FIFO is neither full nor empty. The status generator 126 may determine that a pseudo-sub-empty status PSE obtains when the value of the second read pointer RP2 reaches the value of the write pointer WP and the position of the first read pointer RP1, relative to the write pointer WP, indicates that the main-related FIFO is neither full nor empty.

Additionally, in exemplary embodiments in accordance with principles of inventive concepts, status generator 126 may determine that a pro-pseudo-main-empty status Pro_PME obtains when the FIFO comes close to entering a pseudo-main-empty status in order to prevent entry into a pseudo-main-empty status PME. In exemplary embodiments in accordance with principles of inventive concepts, for example, in the event that the difference (WP−RP1) between the first read pointer RP1 and the write pointer WP is below a reference ΔTH, the status generator 126 may determine that the pro-pseudo-main-empty status Pro_PME, obtains. In exemplary embodiments in accordance with principles of inventive concepts, when the pro-pseudo-main-empty status Pro_PME obtains, an additional operation may be performed to secure data to be provided to the main consumer 130 in order to ensure sufficient data for the main consumer 130 is within the FIFO buffer 120. Memory statuses PMF, PME, PSF, and PSE of the FIFO buffer 120, determined by the status generator 126, may be sent to the flag generator 127. In exemplary embodiments in accordance with principles of inventive concepts, status generator 126 may detect various statuses of the FIFO buffer 120 based on the write pointer WP and the read pointers RP1 and RP2.

In exemplary embodiments in accordance with principles of inventive concepts, flag generator 127 may generate an interrupt signal INTERRUPT based on respective statuses. The flag generator 127 may generate flag signals Wait and Hurry which are provided to the data producer 110, the main consumer 130, or the sub consumer 140, for example. When the pseudo-main-full status PMF obtains, (that is, when FIFO 120 is full of data to be provided to the main consumer 130), the flag generator 127 may generate a wait flag signal Wait to stop data from being pushed from data producer 110 for a time. The flag generator 127 may generate a flag signal for avoiding a situation that would require the generation of the pseudo-main-empty status PME where data is provided to the sub consumer 140 and data is not provided to the main consumer 130. That is, the flag generator 127 may generate the interrupt signal INTERRUPT in response to the pro-pseudo-main-empty status Pro_PME, and may generate a flag signal Hurry which enables data generating and pushing operations of the data producer 110 to be activated (or, wait-released) and data consumption of the sub consumer 140 to be activated. Control methods for avoiding situations that would require the generation of the pseudo-main-empty status PME will be described in greater detail below.

Figure 4:
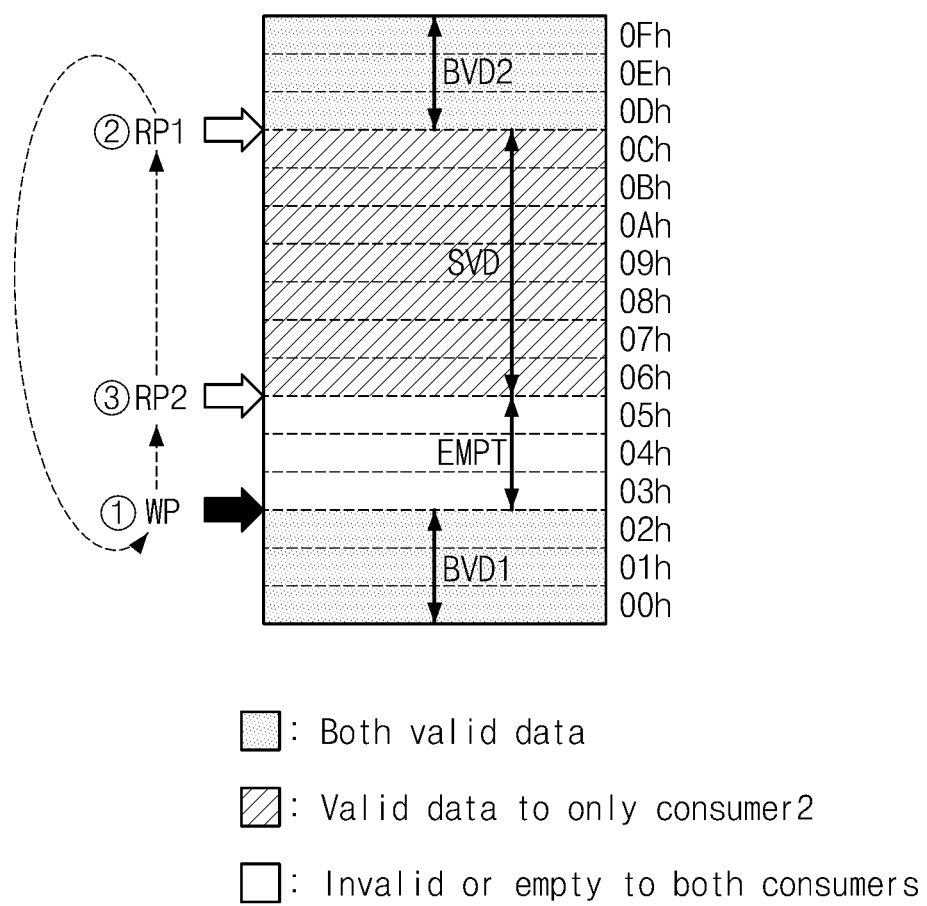
FIG. 4 is a diagram schematically illustrating locations of a write pointer and read pointers in accordance with principles of inventive concepts.

FIG. 4 is a diagram schematically illustrating locations of a write pointer and read pointers in accordance with principles of inventive concepts. Read pointers RP1 and RP2 and a write pointer WP according to a plurality of consumers having different propensities to consume data may be illustrated on a memory map. For ease and clarity of description, a simplified memory map from address 00h to 0Fh is employed for illustrative purposes.

In accordance with principles of inventive concepts memory 121 may be managed using the circular buffer architecture. That is, a first write operation may be performed at an address 00h. However, if a data push operation is generated, a write pointer WP corresponding to a write location may update (increment, in our illustrative examples). In the event that a data push operation is continuously generated, the write pointer WP may increment from the address 00h to an address 0Fh. If the write pointer WP increments from the address 0Fh, it may return to the first address 00h and again increment. Read pointers RP1 and RP2 may increment according to a pop-out request of a main consumer 130 and a sub consumer 140 independently from an increment in the write pointer WP. The read pointers RP1 and RP2 on a frame of data may initially increment from the address 00h, respectively. Because, in an exemplary embodiment in accordance with principles of inventive concepts, data consuming characteristics of the main consumer 130 and the sub consumer 140 are different from each other, increasing patterns of the read pointers RP1 and RP2 may be different from one another. That is, for example, an increasing speed of the first read pointer RP1 corresponding to the main consumer 130 requiring a real-time pop-out operation may be faster than that of the second read pointer RP2 corresponding to the sub consumer 140.

In the exemplary embodiment in accordance with principles of inventive concepts illustrated in FIG. 4, a status exists wherein data between the address 00h and an address 02h corresponding to the write pointer WP is not yet popped out to the main consumer 130 and the sub consumer 140. Thus, data from the address 00h to the address 02h may be valid for the main consumer 130 and sub consumer 140, denoted "both valid data 1," or "BVD1." Also, data BVD2 from an address 0Dh corresponding to the first read pointer RP1 to an address 0Fh may be valid with respect to the main consumer 130 and the sub consumer 140.

In exemplary embodiments in accordance with principles of inventive concepts, data SVD between the second read pointer RP2 and the first read pointer RP1 is invalid with respect to the main consumer 130 but valid for the sub consumer 140. The reason may be that the data SVD between the second read pointer RP2 and the first read pointer RP1 is consumed data with respect to the main consumer 130 but not consumed with respect to the sub consumer 140. A memory area EMP between the write pointer WP and the second read pointer RP2 may correspond to a memory area which is invalid (or, consumed, or empty) with respect to the main consumer 130 and the sub consumer 140.

In exemplary embodiments in accordance with principles of inventive concepts, FIFO buffer 120 may decide a memory status of the FIFO buffer 120 by referring to the write pointer WP and the read pointers RP1 and RP2 and predict the pseudo-main-empty status PME in a situation where, for example, the first read pointer RP1 reflects faster readout to main consumer 130 than the speed of readout to sub consumer 140, as reflected by second read pointer RP2, and RP1 catches up with the write pointer WP. In exemplary embodiments in accordance with principles of inventive concepts, it is possible to perform various prevention methods for avoiding the emptying of FIFO, with regard to, for example, main consumer 130, which would be reflected by the pseudo-main-empty status PME of the FIFO buffer 120.

Figure 5A:
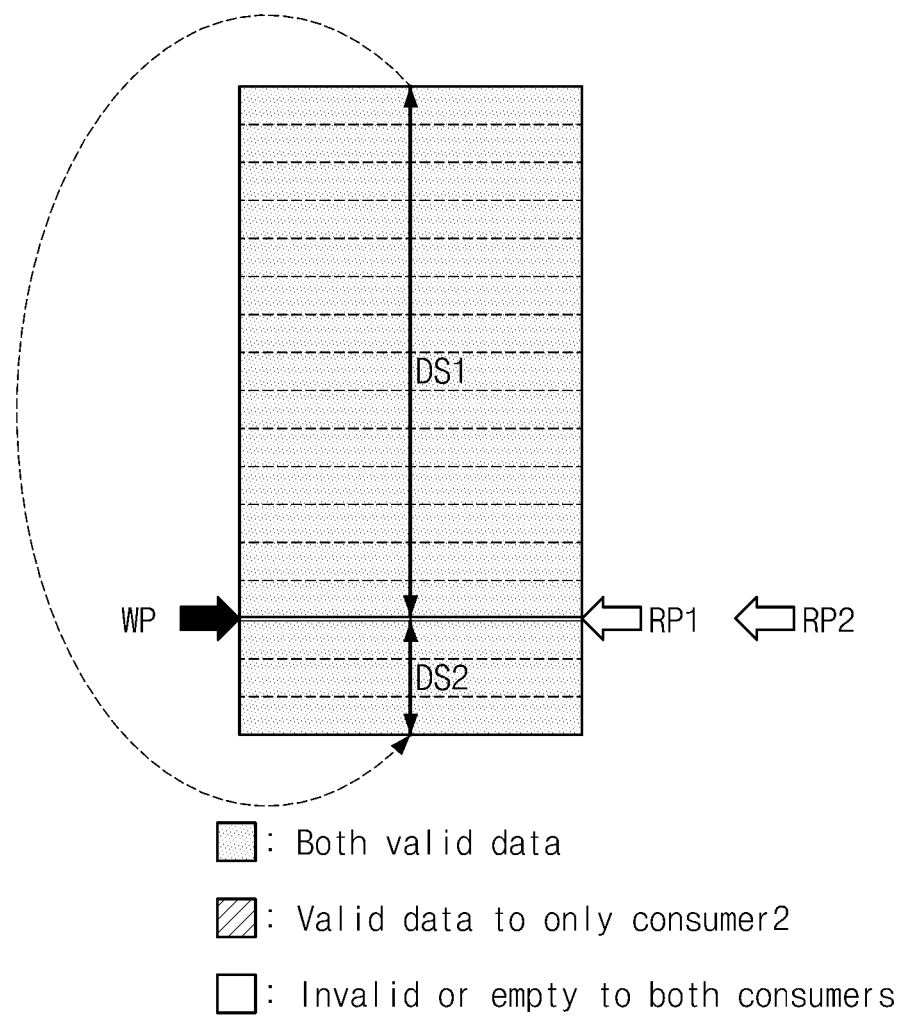
FIGS. 5A and 5B are diagrams schematically illustrating a full status and an empty status of a FIFO buffer.
Figure 5B:
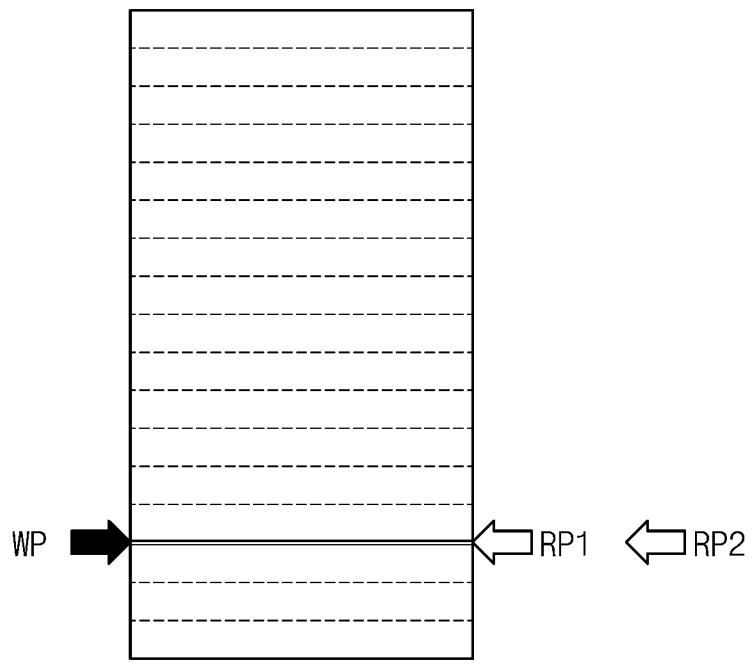

FIGS. 5A and 5B are diagrams schematically illustrating a full status and an empty status of a FIFO buffer, respectively, in accordance with principles of inventive concepts. FIG. 5A shows a status where data is not consumed by consumers after pushed to a FIFO buffer 120. A write pointer WP may correspond to a location obtained by adding memory size, that is, the number of memory locations in FIFO 120, to either of read pointers RP1 and RP2. Thus, the write pointer WP and the read pointers RP1 and RP2 may have the same value and, when consumers perform a data pop-out operation, the read pointers RP1 and RP2 may increment accordingly.

FIG. 5B shows an empty status in an exemplary embodiment in accordance with principles of inventive concepts, where the read pointers RP1 and RP2 have "caught up with" write pointer WP (that is, data has been read out from FIFO 120 up to a location where data will next be written into the FIFO 120, as indicated by write pointer WP, and data to be output does not exist. In this case, the write pointer WP and the read pointers RP1 and RP2 may have the same value (that is, point to the same location.

However, the probability that the above-described full or empty status, other than a reset status of a FIFO buffer 120, may not be high because statuses generated when a plurality of consumers 130 and 140 having different propensities to consume data (that is, different read out rates, for example) share a FIFO buffer 120 will be described with reference to FIGS. 6A to 6D.

Figure 6A:
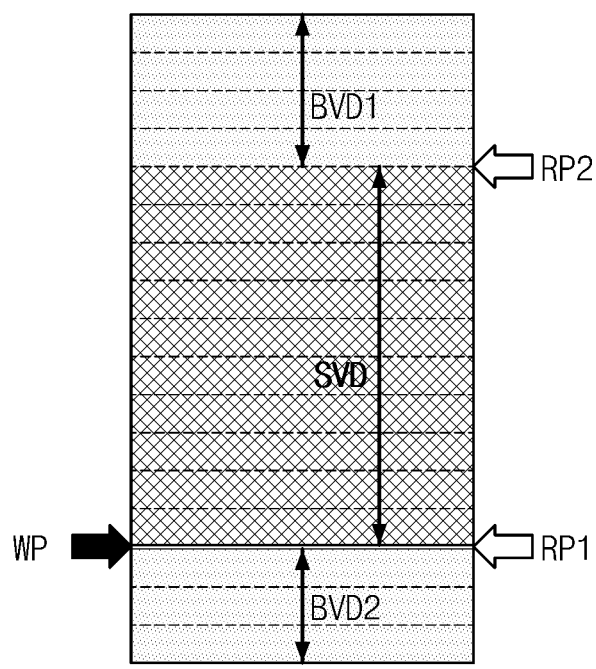
FIGS. 6A to 6D are diagrams schematically illustrating memory maps of statuses of a FIFO buffer in accordance with principles of inventive concepts.
Figure 6B:
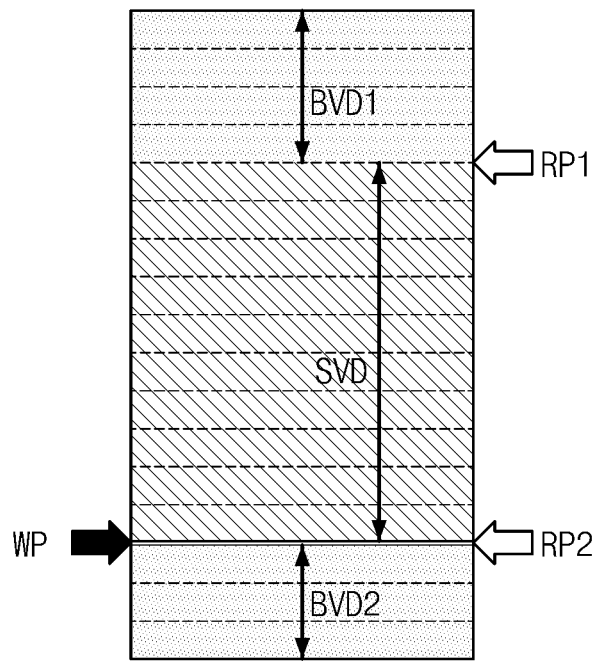
Figure 6C:
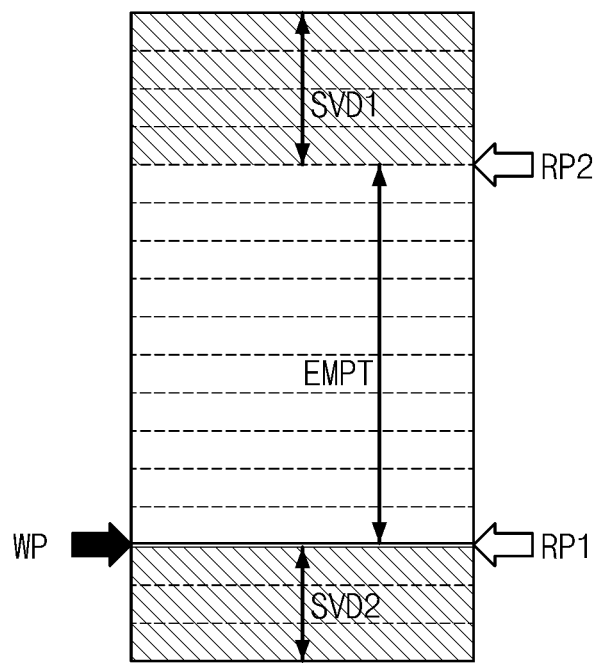
Figure 6D:
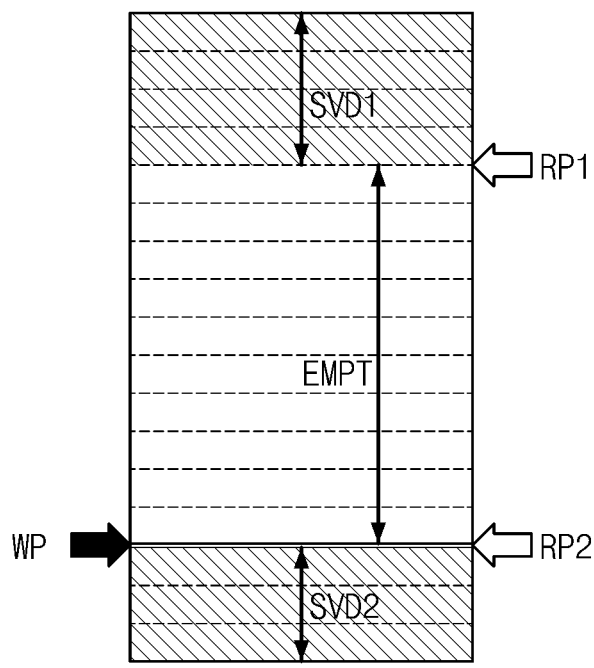

FIGS. 6A to 6D are diagrams schematically illustrating memory maps that reflect different statuses of a FIFO buffer in accordance with principles of inventive concepts. FIG. 6A shows a memory map corresponding to a pseudo-main-full status PMF. FIG. 6B shows a memory map corresponding to a pseudo-sub-full status PSF. FIG. 6C shows a memory map corresponding to a pseudo-main-empty status PME. FIG. 6D shows a memory map corresponding to a pseudo-sub-empty status PSE.

Referring to the exemplary embodiment of FIG. 6A illustrating a PMF status, the write pointer WP has "caught up with" first read pointer RP1 indicating that the entire FIFO contains data that is valid corresponding main consumer 130 Second read pointer RP2 precedes first read pointer RP1 and, therefore, data SVD between locations pointed to by pointers RP1 and RP2 are valid for main consumer but not valid for sub consumer. In an exemplary embodiment in accordance with principles of inventive concepts, main consumer 130 is associated with real-time data consumption. In exemplary embodiments in accordance with principles of inventive concepts, under the pseudo-main-full status PMF, a data producer 110 may wait until an empty area is generated at the FIFO buffer 120 to push data to FIFO 120.

Data SVD, which has not been read out to main consumer 130, as indicated by the position of RP1, but has been read out to sub consumer 140, as indicated by the position of RP2, remains valid for main consumer, but invalid (that is, already read) for sub consumer 140. Because data SVD remains valid for main consumer 130, which may be a real-time data consumer, it will not be overwritten and write pointer WP will not increment beyond the location of RP1. The FIFO 120 will reflect the fact that the FIFO is "full" of main-consumer related data and neither empty nor full of sub-consumer related data by exhibiting a pseudo-main-full PMF status. If the second read pointer RP2 corresponding to the sub consumer 140 increments, a data area (BVD1+BVD2) which is valid with respect to the consumers 130 and 140 may be reduced. Nevertheless, in accordance with principles of inventive concepts, data may be popped out to the main consumer 130 at any time.

In the exemplary embodiment in accordance with principles of inventive concepts of FIG. 6B FIFO 120 illustrates a condition characterized by a pseudo-sub-full status PMF. The second read pointer RP2 corresponding to the sub consumer 140 may be at a full status, and the first read pointer RP1, corresponding to the main consumer 130, which may have a real-time consuming characteristic, may precede the second read pointer RP2 (that is, data may have been read out to main consumer 130 from locations beyond locations from which data has been read out to sub consumer 140). In accordance with principles of inventive concepts, data is not pushed out from data producer 110 to FIFO buffer 120 under such a status.

In the event that the first read pointer RP1 having a real-time consuming characteristic more rapidly increments than second read pointer RP2, the data area (BVD1+BVD2) which is valid with respect to both consumers 130 and 140 may be rapidly diminished. Although data maintained at the data area SVD is valid with respect to the main consumer 130, it may not be valid with respect to the sub consumer 140. If the first read pointer RP1 catches up with the write pointer WP under such a status (because data valid for sub consumer 140 is not overwritten), data will not be available to pop out to main consumer 130 until existing valid sub-consumer data is popped out, allowing more data to be pushed into FIFO 120. Because, in this exemplary embodiment, main consumer 130 is a real-time consumer and, therefore, interruption to its data supply from FIFO 120 could disrupt its operation, a system and method in accordance with principles of inventive concepts avoids a situation reflected in a PME status by monitoring variations (increase or decrease) in the data area that is valid with respect to both consumers 130 and 140 (BVD1+BVD2).

In the exemplary embodiment in accordance with principles of inventive concepts of FIG. 6C FIFO 120 illustrates a condition characterized by a pseudo-main-empty status PME. The pseudo-main-empty status PME may indicate that data is not available for main consumer 130 (which is, for example, a real-time data consumer), regardless of a status of the second read pointer RP2. That is, the pseudo-main-empty status PME may correspond to a situation where the first read pointer RP1 catches up with the write pointer WP (reflecting the fact that data has been popped to main consumer 130 at a rate that has allowed the main consumer data-pop operation to catch up with the data producer push operation). In an exemplary embodiment in accordance with principles of inventive concepts in which main consumer 130 is a real-time data consumer, such a situation is to be avoided. A method and apparatus in accordance with principles of inventive concepts for avoiding such a situation is described in greater detail below.

In the exemplary embodiment in accordance with principles of inventive concepts of FIG. 6D FIFO 120 illustrates a condition characterized by a pseudo-sub-empty status PSE of FIFO buffer 120. The pseudo-sub-empty status PSE may correspond to a status where data is, at least, temporarily, unavailable for sub consumer 140, but, because, in this exemplary embodiment, sub consumer 140 is not a real-time data consumer, the lack of immediate data availability for sub-consumer (while data is still available for main consumer 130) may be readily accommodated in accordance with principles of inventive concepts.

Exemplary embodiments in accordance with principles of inventive concepts in which a FIFO buffer is shared by a plurality of data-consumers will be described in greater detail below. In exemplary embodiments, it is assumed that one data-consumer is assigned a higher priority than another. This may be the case, for example, when a high-priority data-consumer is a time-critical data consumer, such as a real-time data consumer, and the other is not. Exemplary embodiments will be described that avoid the exhaustion of high-priority data (that is, data to be supplied to a real-time data consumer, for example) within a FIFO buffer, as reflected in a pseudo-main-empty PME status. Exemplary embodiments may include scenarios whereby the FIFO is prevented from transitioning from a state characterized by a PSF status to a state characterized by a PME status.

Figure 7:
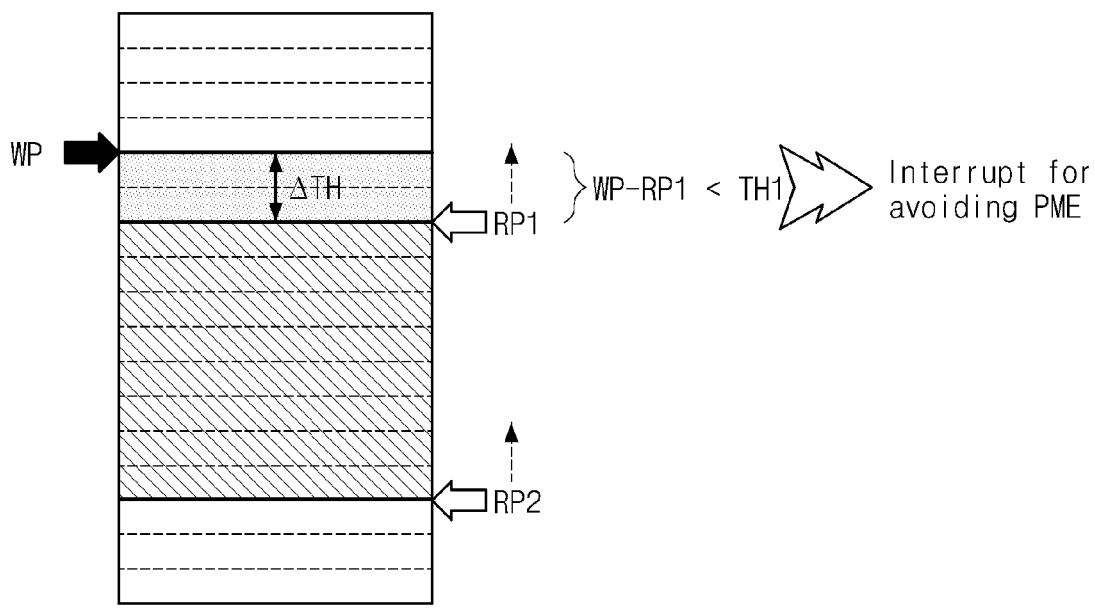
FIG. 7 is a diagram schematically illustrating a method of preventing a transition to a status where data is not provided to consumers consuming data in real time.

In the exemplary embodiment in accordance with principles of inventive concepts of FIG. 7 FIFO 120 illustrates a condition characterized by is a diagram schematically illustrating a method of preventing a transition to a status where data is not provided to a high priority data consumer, such as a real-time data consumer. In an exemplary embodiment in accordance with principles of inventive concepts FIFO may determine that the difference between a first read pointer RP1 having a real-time consuming characteristic and a write pointer WP is less than a threshold value $\Delta TH$ and, in response, FIFO control logic 122 may request a data generating or pushing operation of a data producer 110.

The FIFO control logic 122 may monitor variations in read pointers RP1 and RP2 and the write pointer WP. The FIFO control logic 122 may generate an interrupt signal INTERRUPT when the difference between the first read pointer RP1 and the write pointer WP is less than the threshold value $\Delta TH$. The threshold value $\Delta TH$ may be a value indicating a usable memory space of the FIFO buffer 120, and may be used as a reference for generating the interrupt signal INTERRUPT.

The FIFO control logic 122 may request that the data producer 110 perform a data push operation. The difference between the first read pointer RP1 and the write pointer WP may increase as a result of the push operation and, because this increase in distance between the pointers reflects increasing data available for supply to main consumer 130, data may be continuously popped out to the main consumer 130, which, in exemplary embodiments, is a high-priority consumer due to its requirement for real-time data. As data is pushed, the write pointer WP may increment and the difference between the first read pointer RP1 and the write pointer WP may increase over the threshold value $\Delta TH$. In this manner an apparatus and method in accordance with principles of inventive concepts may avoid a transition to a pseudo-main-empty status PME, which, more importantly, indicates that the exhaustion of real-time data is avoided.

Figure 8:
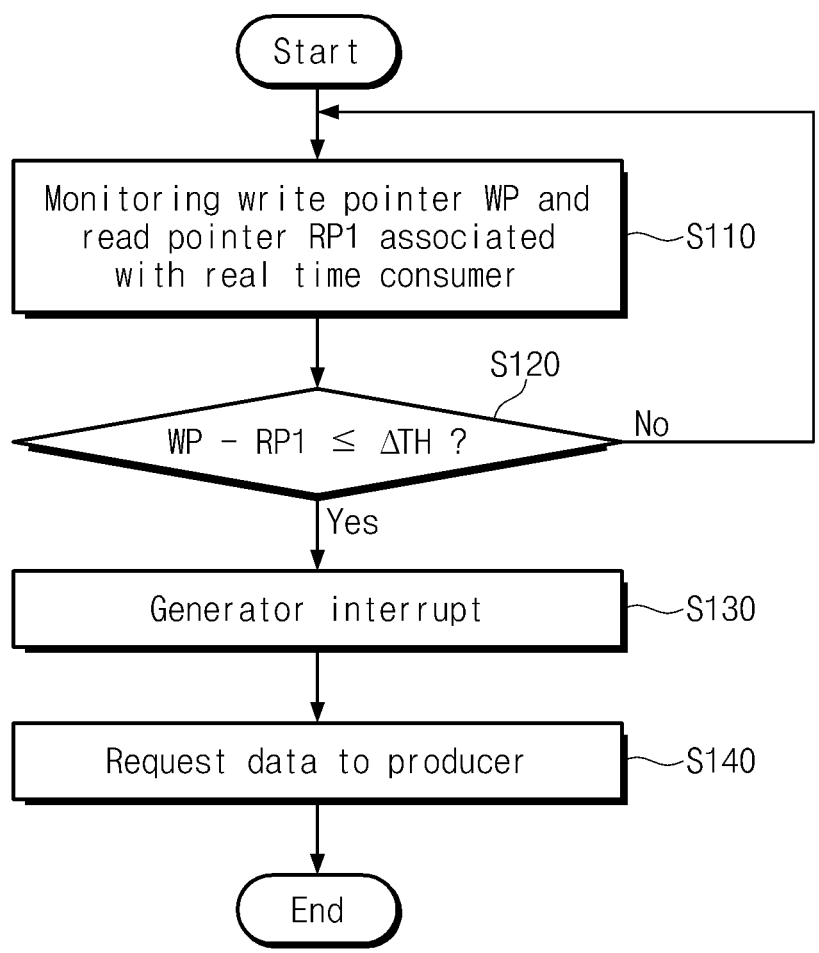
FIG. 8 is a flow chart schematically illustrating a control method of a FIFO buffer in accordance with principles of inventive concepts.

FIG. 8 is a flow chart schematically illustrating an exemplary embodiment of a control method of a FIFO buffer in accordance with principles of inventive concepts in which, it is possible to avoid a pseudo-main-empty status PME where a FIFO buffer 120 does not provide data to a main consumer 130. In an exemplary embodiment, this is accomplished by monitoring a write pointer WP and a read pointer RP1 corresponding to the main consumer 130 having a real-time consuming characteristic.

In operation S110, a status generator 126 (refer to FIG. 3) may monitor increment the write pointer WP and the first read pointer RP1. The first read pointer RP1 may be used to pop data out to the main consumer 130 having a real-time consuming characteristic. The status generator 126 may detect the difference between the write pointer WP and the first read pointer RP1, which in exemplary embodiments, corresponds to the amount of data which available to be popped out to the main consumer 130 having a real-time consuming characteristic. If the difference between the write pointer WP and the first read pointer RP1 were to reach "0", a FIFO buffer 120 may enter a pseudo-main-empty status PME, indicating that a high-priority consumer, such as real-time data consumer main consumer 130 would be "starved" of data and, in turn, operations related to the real time consumption of data, such as displaying a multimedia file, may be negatively impacted.

In operation S120, the status generator 126 may determine whether the difference between the write pointer WP and the first read pointer RP1 is less than or equal to a threshold value ΔTH. If the difference between the write pointer WP and the first read pointer RP1 is more than the threshold value ΔTH, the method may return to operation S110 to monitor the difference between the write pointer WP and the first read pointer RP1. If a difference between the write pointer WP and the first read pointer RP1 is less than the threshold value ΔTH, the status generator 126 may regard the probability of a transition to a pseudo-main-empty status PME to be high. For example, the status generator 126 may determine such a condition (a difference between the write pointer WP and the first read pointer RP1 is less than the threshold value ΔTH) as a pro-pseudo-main-empty status Pro_PME and may proceed to operation S130 to avert a condition characterized by a pseudo-main-empty status PME.

In operation S130, a flag generator 127 may generate an interrupt signal INTERRUPT to initiate a push operation from a data producer 110. In exemplary embodiments in accordance with principles of inventive concepts, although an INTERRUPT signal may initiate the transfer of data from data producer 110, data may also be transferred from data producer 110 without using an INTERRUPT signal.

In operation S140, through generation of the interrupt signal INTERRUPT, the FIFO control logic 122 may request a data generating operation at the data producer 110. In response to a request for a data generating operation, the data producer 110 may execute a data push operation to the FIFO buffer 120. In response, the write pointer WP of the FIFO buffer 120 increments and the difference between the write pointer WP and the first read pointer RP1 may become greater than the threshold value ΔTH.

A basic control method in accordance with principles of inventive concepts for preventing a transition to the pseudo-main-empty status PME is described with reference to FIG. 8. However, statuses of the FIFO buffer 120 may vary in real time according to variations in the write pointer WP and the read pointers RP1 and RP2 and various problems that could be caused by a difference between an increasing speed of the read pointer RP1 and an increasing speed of the read pointer RP2 may be avoided in accordance with principles of inventive concepts, as described below.

Figure 9A:
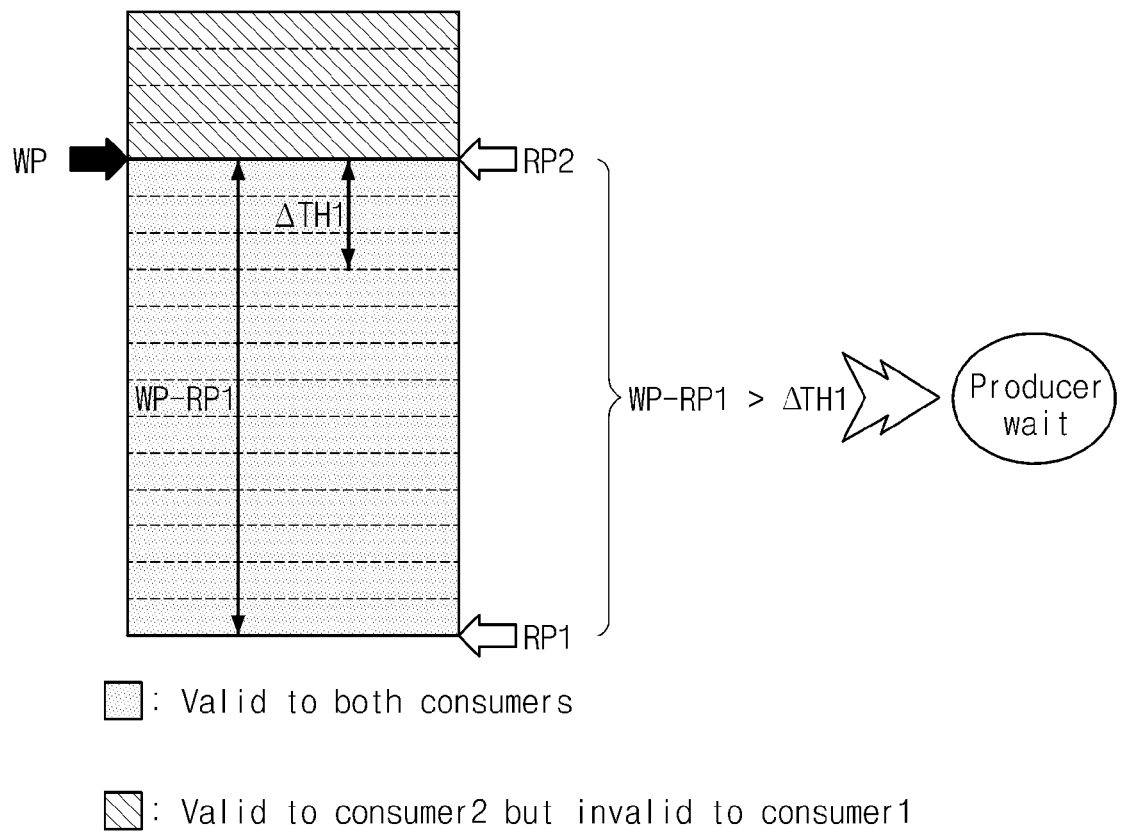
FIGS. 9A and 9B are diagrams schematically illustrating a method of solving a problem generated at a pseudo-sub-full status.
Figure 9B:
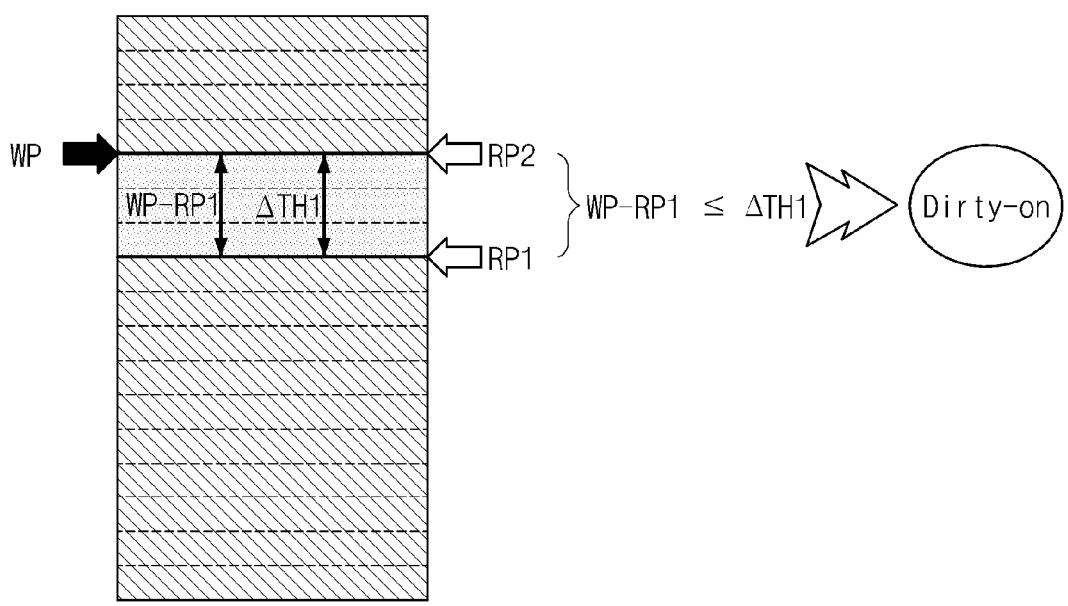

FIGS. 9A and 9B are memory diagrams schematically illustrating a method in accordance with principles of inventive concepts of avoiding the data-starvation of a high priority consumer, such as main consumer 130, which may operate with time-critical data, for example. FIG. 9A shows a status where a main consumer 130 continues to consume data under a pseudo-sub-full status PSF while sub consumer 140 does not pop data out.

If data pop-out operation of the sub consumer 140 on data stored at a FIFO buffer 120 is not executed while data is popped out to main consumer 130 (and data pushed to FIFO from data producer 110) the difference between second read pointer RP2 and write pointer WP could reach buffer size FIFO_SIZE. In this case, a data push operation of the data producer 110 may be at a wait status. However, because, in this exemplary embodiment, the main consumer 130 continues to pop data out, a first read pointer RP1 may follow the write pointer WP.

If data is continuously popped out by the main consumer 130 without pop-out by the sub consumer 140, a pseudo-sub-full status PSF and a pseudo-main-empty status PME could be generated at the same time, preventing the supply of data to the main consumer 130. An apparatus and method in accordance with principles of inventive concepts avoids avoid such a situation by monitoring first read pointer RP1 and, if the difference between the write pointer WP and the first read pointer RP1 is more than a first threshold value ΔTH1, a wait on a data push operation of the data producer 110 may be requested and, a hurry flag Hurry for hurrying data consumption of the sub consumer 140 may be generated.

In the exemplary embodiment in accordance with principles of inventive concepts of FIG. 9B the difference between the write pointer WP and the first read pointer RP1 decreases below the first threshold value ΔTH1 while the FIFO exhibits a pseudo-sub-full status PSF. In an exemplary embodiment in which speed of the read pointer RP1 is fast compared to the write pointer WP the FIFO could switch into a pseudo-main-empty status PME. In exemplary embodiments in accordance with principles of inventive concepts in order to avoid data starvation of a high-priority data consumer, such as main consumer 130, a FIFO may, in an approach referred to herein as a "dirty on" method, deprive a lower priority data consumer, such as sub consumer 140, of data, overwriting data that is valid to the lower priority consumer in order to provide valid data to the higher priority data consumer. When a dirty on approach is employed, a FIFO in accordance with principles of inventive concepts indicates to a lower priority data consumer that overwritten data is invalid. In exemplary embodiments in accordance with principles of inventive concepts, FIFO control logic 122 may release a wait request of the data producer 110 (which the FIFO may have initiated in order to allow data to be popped to sub consumer 140, for example). Subsequently, data provided from the data producer 110 may be overwritten at the FIFO buffer 120 regardless of a status of the sub consumer 140. This operation may be referred to as dirty-on. That is, the dirty-on may mean an operation of overwriting data at the FIFO buffer 120 to prevent the main consumer 130 from entering a fatal status although data required by the sub consumer 140 is not popped out. In this case, the FIFO control logic 122 may check generation of a dirty bit to inform the sub consumer 140 of the checking result.

Although a dirty-on operation may be employed, as just described, in accordance with principles of inventive concepts, in such an approach, although data is provided to main consumer 130 in a timely fashion (the main consumer 130 does not enter a fatal status) data to be provided to the sub consumer 140 may be sacrificed. In exemplary embodiments in accordance with principles of inventive concepts, FIFO buffer 120 may be prevented from switching into a pseudo-main-empty status PME without employing a dirty-on approach, as will be described below.

Figure 10:
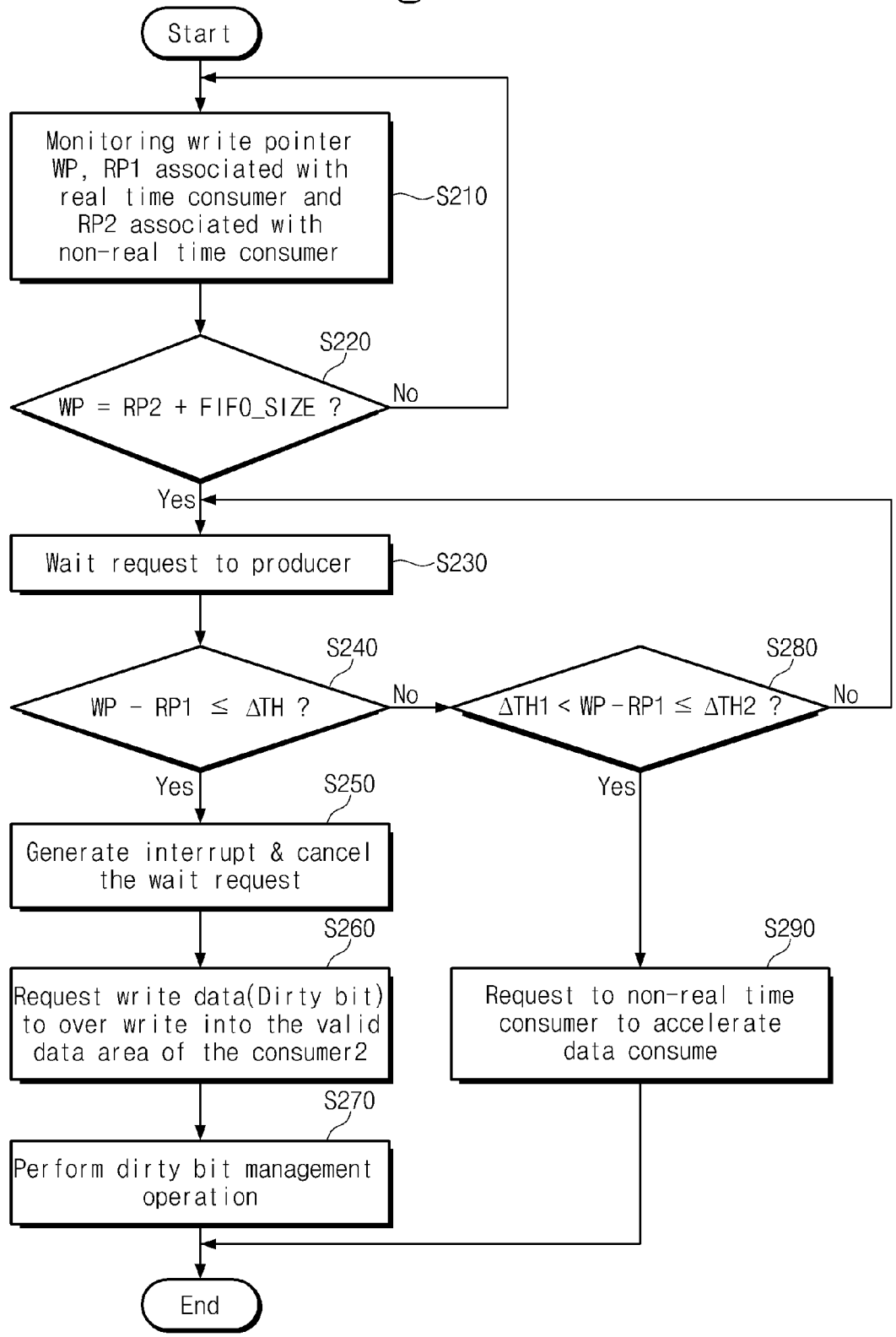
FIG. 10 is a flow chart schematically illustrating a control method of a FIFO buffer according to another embodiment in accordance with principles of inventive concepts.

FIG. 10 is a flow chart schematically illustrating a control method of a FIFO buffer in accordance with principles of inventive concepts in which it is possible to avoid use of a dirty-on approach to preventing data-starvation of main consumer 130 by applying at least two threshold values $\Delta TH1$ and $\Delta TH2$ to the difference between first read pointer RP1 and write pointer WP.

In operation S210, FIFO control logic 122 may monitor write pointer WP and read pointers RP1 and RP2 and the difference between the write pointer WP and the second read pointer RP2, which corresponds to sub consumer 140 having a non-real-time consuming characteristic, may be detected.

In operation S220, the FIFO control logic 122 may determine whether a condition exists corresponding to a pseudo-sub-full status PSF. That is, the FIFO control logic 122 may determine whether the difference between the second read pointer RP2 and the write pointer WP corresponds to a capacity FIFO_SIZE of the FIFO buffer 120. If the difference between the second read pointer RP2 and the write pointer WP corresponds to a capacity FIFO_SIZE of the FIFO buffer 120, the FIFO buffer 120 may be determined to be at a pseudo-sub-full status PSF. When the FIFO buffer 120 is at a pseudo-sub-full status PSF, the method may proceed to operation S230. If a data status of the FIFO buffer 120 is not a pseudo-sub-full status PSF, the method may return to operation S210.

In operation S230, because the second read pointer RP2 does not increment under the pseudo-sub-full status PSF, writing of data to the FIFO buffer 120 would generally, not take place (because a full FIFO buffer of data has not been popped out to sub consumer, for example). As a result, the data producer 110 may be in a wait status until data is popped out to the sub consumer 140 and an empty area is generated. The wait state may be initiated by a request of the FIFO control logic 122, which employs an INTERRUPT signal to place data generating and pushing operations of the data producer 110 in a wait state.

In operation S240, the FIFO control logic 122 may determine whether the difference between the write pointer WP and the first read pointer RP1 is greater than the first threshold value $\Delta TH1$ and, if so, the method proceeds to operation S280. If the difference less than or equal to the first threshold value $\Delta TH1$, the method proceeds to operation S250 to execute a dirty-on operation in order to prevent a transition to a fatal status (that is, to prevent data starvation of main consumer 130).

In operation S250, the FIFO control logic 122 may generate an interrupt signal INTERRUPT for a dirty-on operation, and release a wait request on data generating and pushing operations of the data producer 110.

In operation S260, the FIFO control logic 122 may overwrite data supplied by data producer 110 in response to a release of the wait request (which had been initiated to pop data to sub consumer 140). With this dirty-on operation, the FIFO buffer 120 may be written with data which the main consumer 130 needs but the sub consumer 140 does not need (dirty bit).

In operation S270, the FIFO control logic 122 may request a dirty bit managing operation at the sub consumer 140 or a system. To process the dirty bit, for example, the sub consumer 140 may discard frame data associated with the dirty bit.

In operation S280, the FIFO control logic 122 may determine whether the difference between the write pointer WP and the first read pointer RP1 is greater than the second threshold value $\Delta TH2$ and, If the difference between the write pointer WP and the first read pointer RP1 is greater than the first threshold value $\Delta TH1$ and less than the second threshold value $\Delta TH2$, the method proceeds to operation S290. On the other hand, if a difference between the write pointer WP and the first read pointer RP1 is greater than the second threshold value $\Delta TH2$, the method proceeds to operation S230.

In operation S290, the FIFO control logic 122 may hurry data consumption of the sub consumer 140. If data is popped out by the sub consumer 140, the second read pointer RP2 may increment, so that an empty area exists at the FIFO buffer 120 and because it is possible to increment the write pointer WP (that is, it is possible to write new data to the FIFO), the worst case (i.e., a transition to a pseudo-main-empty status PME) may be avoided.

Figure 11:
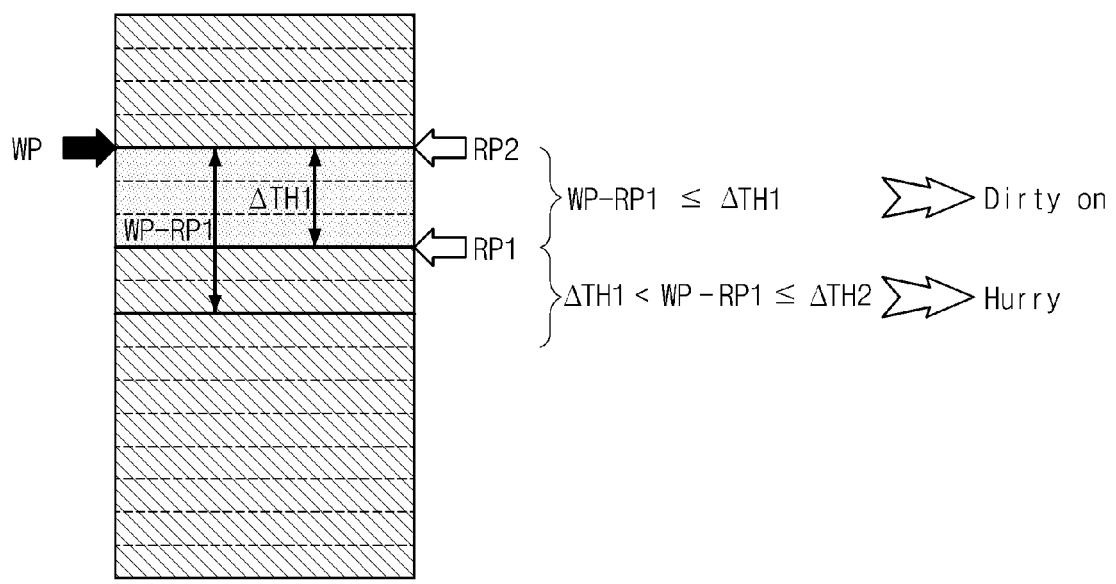
FIG. 11 is a diagram schematically illustrating a memory map of statuses of a FIFO buffer for applying a control method of FIG. 10.

FIG. 11 is a diagram schematically illustrating a memory map of statuses of a FIFO buffer for applying a control method in accordance with principles of inventive concepts, such as that described in the discussion related to FIG. 10. When the difference between a write pointer WP and first read pointer RP1 is less than a second threshold value $\Delta TH2$, data consumption of a sub consumer 140 may be hurried to prevent a dirty-on operation from being performed. Data may be popped out by the sub consumer 140, and a second read pointer RP2 may increment. As the second read pointer RP2 increments, there may be secured a memory area of the FIFO buffer 120 where data is pushed. Since writing of data to an empty area on the FIFO buffer 120 is possible, the difference between the write pointer WP and the first read pointer RP1 may increase. In this manner in accordance with principles of inventive concepts, it is possible to prevent a status of the FIFO buffer 120 from being switched into a pseudo-main-empty status PME by applying two threshold values $\Delta TH1$ and $\Delta TH2$.

Figure 12:
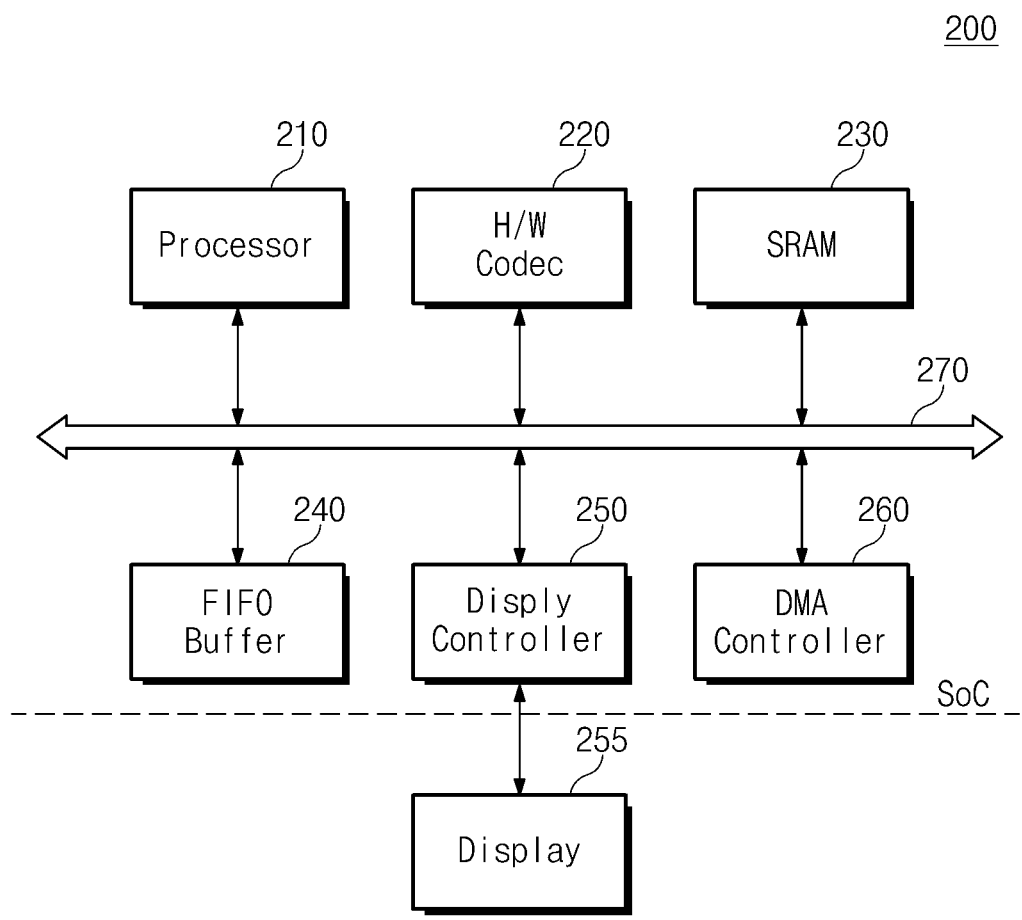
FIG. 12 is a block diagram schematically illustrating a mobile device according to another embodiment in accordance with principles of inventive concepts.

FIG. 12 is a block diagram schematically illustrating an exemplary embodiment of a mobile device in accordance with principles of inventive concepts. Mobile device 200 may include a processor 210, a hardware codec 220, an SRAM 230, a FIFO buffer 240, a display controller 250, a display 255, a DMA controller 260, and a system bus 270.

The processor 210 may be controlled by an operating system (OS) or an application program driving the mobile device 200. The processor 210 may be configured to drive various programs or hardware drivers. An operation of the mobile device 200 may be controlled by the processor 210 formed of a single core or multiple cores. Also, data generated by the processor 210 may be transferred to the FIFO buffer 240, which may be a FIFO in accordance with principles of inventive concepts as previously described herein.

The hardware codec 220 may decode input data to be restored to an image signal for playing. In particular, the hardware codec 220 may process decoded image data by units of frames to provide it to the display controller 250 or the DMA controller 260. The hardware codec 220 may play a role of a data producer 110 (refer to FIG. 1) which generates and provides data. The SRAM 230 may be used as a working memory or a buffer memory of the mobile device 200.

The FIFO buffer 240 may indicate at least one FIFO buffer included in the mobile device 200. The FIFO buffer 240 may be shared by a plurality of consumers. Thus, in the event that data is provided to a plurality of consumers having different propensities to consume data, the FIFO buffer 240 may be controlled such that data to be transferred to a functional block having time critical (such as, for example, real-time) consuming characteristic is not exhausted.

The display controller 250 and the display 255 may receive frame data stored at the FIFO buffer 240 in real time to display it. Thus, the display controller 250 may correspond to main consumers which consume data stored at the FIFO buffer 240 in real time.

The DMA controller 260 may send frame data stored at the FIFO buffer 240 to a memory (e.g., SRAM 230) for backup. The DMA controller 260 may correspond to sub consumers where there is no problem although data is not provided in real time.

Data may be substantially transferred through the system bus 270. The system bus 270 may include a data bus, a control bus, and so on. Components other than the display 255 may be provided in a system-on-chip form in accordance with principles of inventive concepts.

Figure 13:
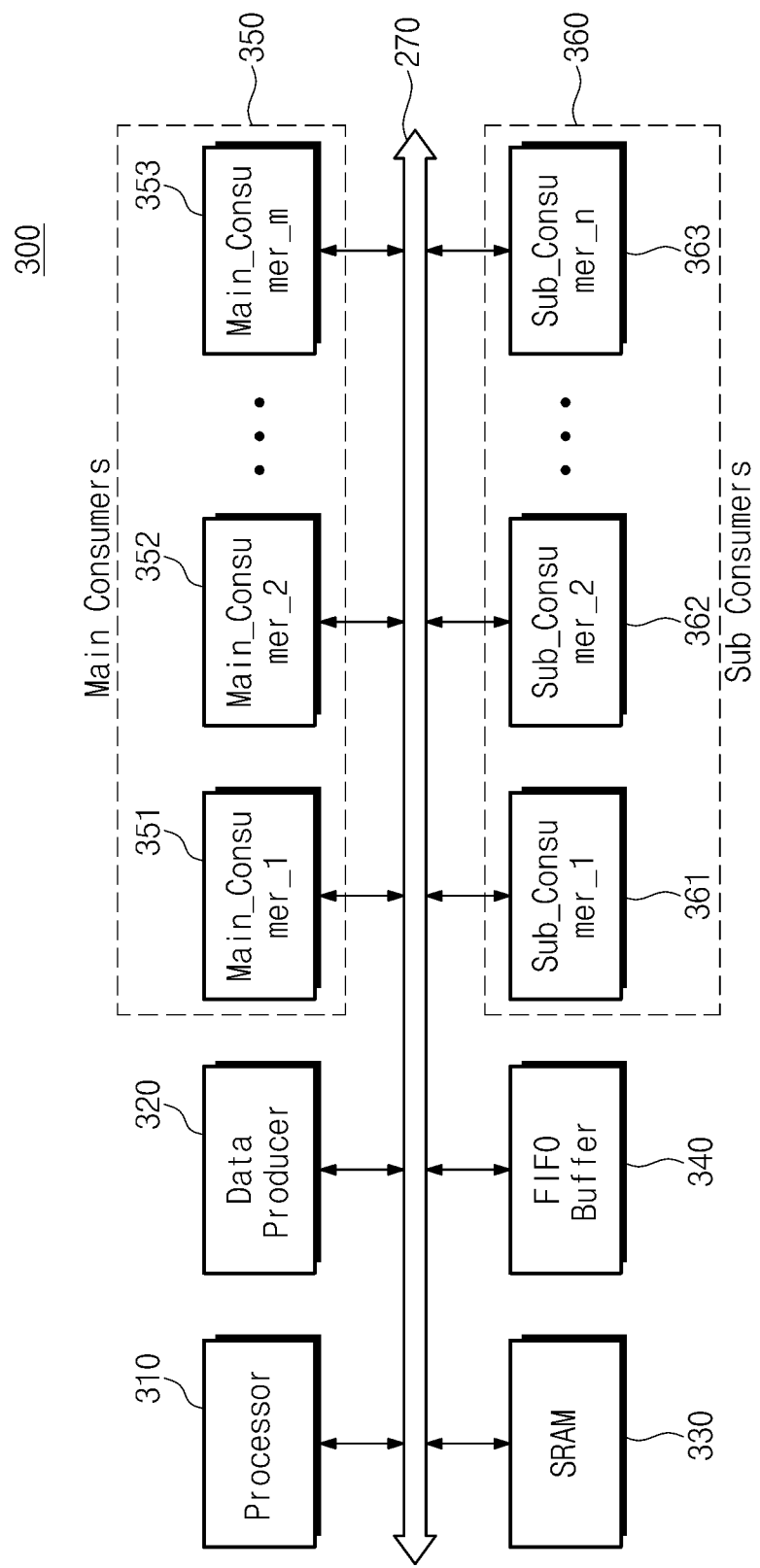
FIG. 13 is a block diagram schematically illustrating a system-on-chip according to still another embodiment in accordance with principles of inventive concepts.

FIG. 13 is a block diagram schematically illustrating an exemplary embodiment of system-on-chip in accordance with principles of inventive concepts. System-on-chip 300 may include a plurality of main consumers 350 consuming data in real time and a plurality of sub consumers 360 consuming data in non-real time. A FIFO buffer 340 may be shared by the main consumers 350 and the sub consumers 360. In addition, the system-on-chip 300 may include a processor 310, a data producer 320, an SRAM 330, and the FIFO buffer 340.

The processor 310 and the SRAM 330 may be substantially the same as components 210 and 230 described with reference to FIG. 12. The data producer 320 may correspond to a functional block which provides data to the main consumers 350 or the sub consumers 360 through the FIFO buffer 340. For example, the data producer 320 may be a hardware codec or an image converter for converting image data to be suitable for a format of the mobile device 300. Alternatively, the data producer 320 may be a mass storage device which continuously provides image contents. In addition, the processor 310 or the SRAM 330 may be included in the data producer 320 in a broad sense.

Data generated by the data producer 320 may be transferred to the FIFO buffer 340. Data pushed from the data producer 320 may be sequentially written at a location of the FIFO buffer 340 corresponding to a write pointer WP. Data stored at the FIFO buffer 340 may be popped out to the main consumers 351, 352, and 353 and the sub consumers 361, 362, and 363. A data consuming characteristic of the main consumers 350 may be different from that of the sub consumers 360. For example, the main consumers 350 may be components which have to be provided with data in real time. On the other hand, the sub consumers 360 may be components which consume data in non-real time. However, read pointers of the main consumers 351, 352, and 353 may be independent from read pointers of the sub consumers 361, 362, and 363.

The FIFO buffer 340 may include at least one input port and multiple output ports each corresponding to the main consumers 351, 352, and 353 and the sub consumers 361, 362, and 363. The multiple output ports may be configured to be assigned to consumers, respectively. Or, the multiple output ports may be configured such that time slots on an output port are assigned to a plurality of consumers.

The FIFO buffer 340 may perform status detecting and controlling operations, a flag generating operation, etc. to avoid a pseudo-main-empty status PME, corresponding to a situation where data to be provided to the main consumers 350 is insufficient or empty. For example, if it is assumed that a read pointer MRPj of at least one of the main consumers 350 increments toward an empty status under a status where at least one Sub_Consumer_i of the sub consumers 360 is fully filled. At this time, the FIFO buffer 340 may generate an interrupt signal INTERRUPT and hurry data consumption of a sub consumer Sub_Consumer_i corresponding to a full status.

Alternatively, the FIFO buffer 340 may activate a dirty-on operation at a point of time when the difference between a write pointer WP and a read pointer MRP_k of a main consumer 350 having the highest data consuming speed is less than a threshold value. Data to be overwritten may be referred to as "a dirty bit" and may be non-critical to sub consumers 360. In addition, the FIFO buffer 340 may perform operations of comparing the difference between a write pointer WP and a read pointer MRP_k of a main consumer 350 having the highest data consuming speed with at least two threshold values and preventing a transition to a dirty-on status (that is, avoiding use of a dirty on operation, while still providing critical data to the consumer with the highest data-consuming rate).

Figure 14:
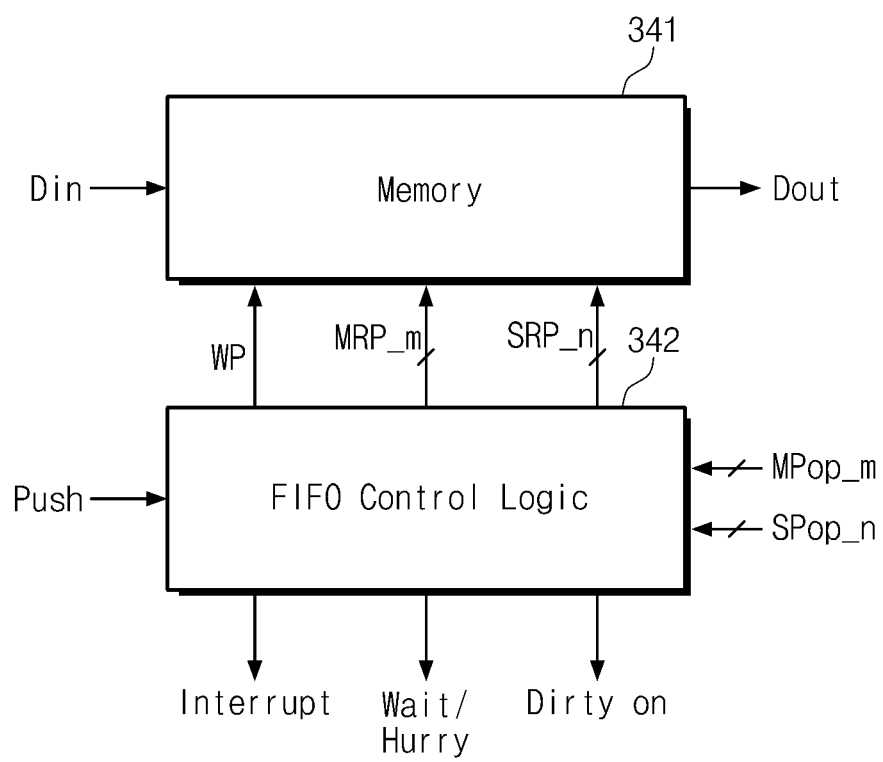
FIG. 14 is a block diagram schematically illustrating a FIFO buffer of FIG. 13.

FIG. 14 is a block diagram schematically illustrating an exemplary embodiment of FIFO buffer such as that described in the discussion related to FIG. 13. Referring to FIG. 14, a FIFO buffer 340 may include a memory 341 and FIFO control logic 342.

The memory 341 may write input data Din at a location corresponding to a write pointer WP. Data of the multi-port memory 341 may be output in response to read pointers MRP_m and SRP_n. The memory 341 may provide data to a plurality of consumers, each corresponding to the read pointers MRP_m and SRP_n. In exemplary embodiments in accordance with principles of inventive concepts, memory 341 may be formed of an SRAM having a plurality of output ports.

The FIFO control logic 342 may generate the write pointer WP in response to a data push signal Push from a data producer 320 (refer to FIG. 13). The FIFO control logic 342 may generate read pointers MRP_m in response to pop-out signals MPop_m from a plurality of main consumers 350. The FIFO control logic 342 may generate read pointers SRP_n in response to pop-out signals SMPop_n from a plurality of sub consumers 360. Push signal Push or the pop-out signals MPop_m and SPop_n may be a write clock or a read clock, for example.

The FIFO control logic 342 may determine a status of the FIFO buffer 340 based on the write pointer WP and the read pointers MRP_m and SRP_n. The FIFO control logic 342 may determine a status of the FIFO buffer 340 on each of the consumers 350 and 360. The FIFO control logic 342 may monitor the write pointer WP and the read pointers MRP_m to prevent a transition to a pseudo-main-empty status PME in which data to be provided to at least one of the main consumers 350 having a real-time consuming characteristic is not available at the FIFO buffer 340. In the event that the difference between the write pointer WP and at least one of the read pointers MRP_m is less than a first threshold value ΔTH1, the FIFO control logic 342 may activate a dirty-on operation to prevent a fatal error. On the other hand, if a difference between the write pointer WP and at least one of the read pointers MRP_m is more than the first threshold value ΔTH1 and less than a second threshold value ΔTH2, the FIFO control logic 342 may request data consumption on at least one of a plurality of sub consumers 360. For this request, the FIFO control logic 342 may generate an interrupt flag Interrupt, a wait flag Wait, or a hurry flag Hurry, or a combination thereof.

Figure 15:
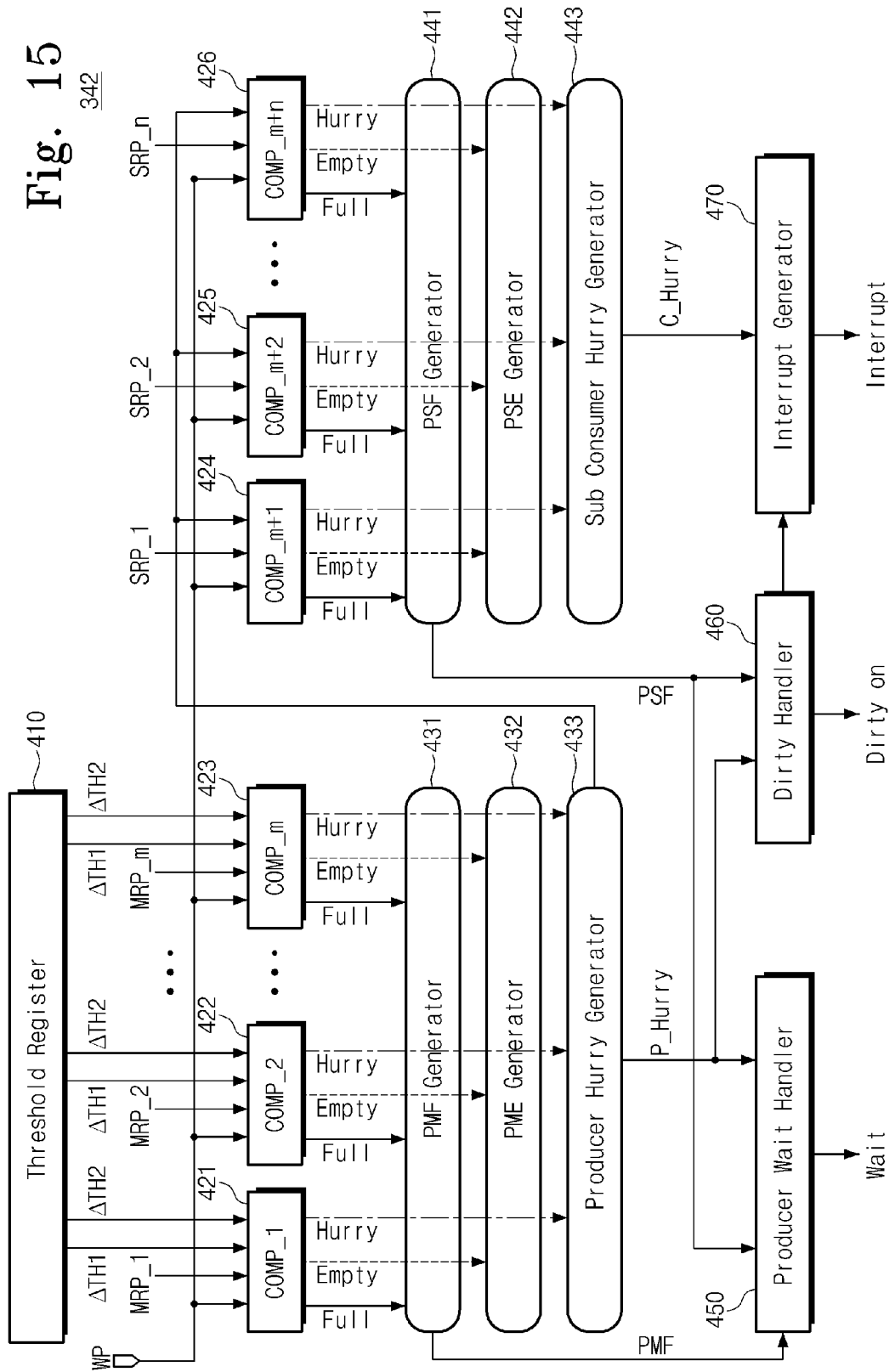
FIG. 15 is a block diagram schematically illustrating FIFO control logic of FIG. 14.

FIG. 15 is a block diagram schematically illustrating an exemplary embodiment of FIFO control logic such as described in the discussion related to FIG. 14. Referring to FIG. 15, FIFO control logic 342 may include a threshold register 410, a plurality of comparators 421 to 426, status generators 431, 432, 441, and 442, hurry generators 433 and 443, a producer wait handler 450, a dirty handler 460, and an interrupt generator 470.

The threshold register 410 may be used to store a reference value set to perform precautions before a status of a FIFO buffer 340 is switched into a pseudo-main-empty status PME. For example, if the difference between a write pointer WP and a read pointer MRP_m of a main consumer 350 is less than a first threshold value ΔTH1, a dirty-on operation may be activated. On the other hand, if the difference between a write pointer WP and a read pointer MRP_m of a main consumer 350 is more than the first threshold value ΔTH1 and less than a second threshold value ΔTH2, the FIFO control logic 342 may request data consumption from at least one of a plurality of sub consumers 360. Setting values of the first and second threshold values ΔTH2 and ΔTH2 may be stored at the threshold register 410. The first and second threshold values ΔTH2 and ΔTH2 may be set to have values optimized according to data consuming characteristics of the main consumers 350, for example. The first and second threshold values ΔTH2 and ΔTH2 may be set with experimental values considering data consuming characteristics of the main consumers 350, for example.

Each of the comparators 421, 422, and 423 may receive the write pointer WP. Read pointers MRP_1 to MRP_m may be provided to the comparators 421 to 423, respectively. Each of the comparators 421, 422, and 423 may receive the first and second threshold values ΔTH2 and ΔTH2 from the threshold register 410.

The comparator 421 may receive the first and second threshold values ΔTH2 and ΔTH2. The comparator 421 may receive the write pointer WP and the write pointer MRP_1. The comparator 421 may compare the difference (WP−MRP1) between the write pointer WP and read pointers MRP_1 of main consumers 351 with the first and second threshold values ΔTH2 and ΔTH2. If the comparison result indicates that the write pointer WP is more by a buffer size FIFO_SIZE than the read pointer MRP_1, the comparator 421 may output a full signal Full. The full signal Full may be transferred to the pseudo-main-full (PMF) generator 431. If the difference (WP−MRP1) is "0", the comparator 421 may generate an empty signal Empty to transfer it to a pseudo-main-empty (PME) generator 432. When the difference (WP−MRP1) is less than the first threshold value ΔTH1, the probability on a fatal error may be high. In this case, the comparator 421 may generate a flag signal Hurry for a dirty-on operation to provide it to the producer hurry generator 433.

Each of the comparators 422 to 423 may be substantially the same as the comparator 421 except that they are provided with read pointers MRP_2 to MRP_m.

The pseudo-main-full (PMF) status generator 431 may be provided with full signals full from the comparators 421 to 423. If at least one of a plurality of main consumers 350 outputs a full signal Full, the PMF status generator 431 may determine the FIFO buffer 340 to be at a pseudo-main-full status PMF. Thus, in exemplary embodiments in accordance with principles of inventive concepts the PMF status generator 431 may generate a status signal corresponding to the pseudo-main-full status PMF to transfer it to the producer wait handler 450.

The pseudo-main-empty (PME) status generator 432 may be supplied with empty signals Empty from the comparators 421 to 423.

If at least one of a plurality of main consumers 350 outputs an empty signal Empty, the PME status generator 432 may determine the FIFO buffer 340 to be at a pseudo-main-empty status PME and, the PME status generator 432 may generate a status signal corresponding to the pseudo-main-empty status PME. The pseudo-main-empty status PME may be a status of the FIFO buffer 34 which should be avoided.

In accordance with principles of inventive concepts, producer hurry generator 433 may be supplied with hurry signals Hurry from the comparators 421 to 423. If the difference between a write pointer WP of at least one of the main consumers 350 and a read pointer MRP_i is less than the first threshold value ΔTH1, the producer hurry generator 433 may be provided with the hurry signal Hurry. The producer hurry generator 433 may then send the hurry signal Hurry to the producer wait handler 450 such that a wait status of a data producer 320 is released. The producer hurry generator 433 may send the hurry signal Hurry to the dirty handler 460 such that a dirty-on operation is performed. At this time, the hurry signal Hurry may be provided to comparators 424 to 426 each corresponding to a plurality of sub consumers 360.

In accordance with principles of inventive concepts, comparators 424 to 426 each corresponding to the sub consumers 360 may be supplied with the write pointer WP. Also, the comparators 424 to 426 may be supplied with read pointers SRP_1 to SRP_m, respectively. The comparator 424 may receive the write pointer WP and the read pointer SRP_1. The comparator 424 may detect a difference (WP−SRP1) between the write pointer WP and a read pointer SRP_1 of a sub consumer 361. If the difference (WP−SRP1) between the write pointer WP and the read pointer SRP_1 is "0", the comparator 424 may generate an empty signal Empty. The comparator 424 may request a pop-out operation at the sub consumer 361 at a pseudo-sub-full status PSF where a difference (WP−SRP1) between the write pointer WP and the read pointer SRP_1 corresponds to a buffer size FIFO_SIZE. The hurry signal Hurry may be sent to a sub consumer hurry generator 443.

In accordance with principles of inventive concepts, pseudo-sub-full (PSF) status generator 441 may be provided with full signals full from the comparators 424 to 426. If at least one of a plurality of sub consumers 360 is detected to be at a full status, the PSF status generator 441 may determine the FIFO buffer 340 to be at a pseudo-sub-full status PSF. The PSF status generator 441 may generate a status signal corresponding to the pseudo-sub-full status PSF to transfer it to the producer wait handler 450 and the dirty handler 460.

In accordance with principles of inventive concepts, pseudo-sub-empty (PSE) status generator 442 may be provided with empty signals Empty from the comparators 424 to 426. If at least one of the sub consumers 360 is at an empty state, the PSE status generator 442 may determine the FIFO buffer 340 to be at a pseudo-sub-empty status PME. The PSE status generator 442 may generate a status signal corresponding to the pseudo-sub-empty status PME. The pseudo-sub-empty status PME may be released when the write pointer WP increments by lapse of time and, as a result, the pseudo-sub-empty status PME may not be problematic.

In accordance with principles of inventive concepts, sub consumer hurry generator 443 may be provided with hurry signals Hurry from the comparators 424 to 426. If at least one of the sub consumers 360 is at a full state, the sub consumer hurry generator 443 may output a hurry signal C_Hurry for hurrying data consumption to corresponding sub consumers. At this time, the hurry signal C_Hurry may be provided to the interrupt generator 470. Under this condition, the hurry signal C_Hurry may be provided to a corresponding sub consumer 361. The hurry signal C_Hurry provided to a sub consumer and the hurry signal C_Hurry provided to the data producer 340 may be in complementary relations, for example.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A system-on-chip comprising:
a data producer;
a FIFO buffer which stores data transferred from the data producer at a memory area corresponding to a write pointer;
a first consumer which pops out data of a memory area corresponding to a first read pointer of the FIFO buffer; and
a second consumer which pops out data of a memory area corresponding to a second read pointer of the FIFO buffer,
wherein the FIFO buffer requests a pop-out operation at the second consumer according to the difference between the write pointer and the first read pointer or overwrites data provided from the data producer at a memory area corresponding to the second read pointer, wherein if the difference between the second read pointer and the write pointer corresponds to the size of the FIFO buffer and the difference between the first read pointer and the write pointer is more than a first threshold value and less than a second threshold value, the FIFO buffer request a pop-out operation by the second consumer.

2. The system-on-chip of claim 1, wherein the first consumer is a functional block consuming data in real time and the second consumer consumes data in non-real time.

3. The system-on-chip of claim 1, wherein if the difference between the second read pointer and the write pointer corresponds to the size of the FIFO buffer and the difference between the first read pointer and the write pointer is less than a first threshold value, the FIFO buffer overwrites data from the data producer at a memory area corresponding to the second read pointer.

4. The system-on-chip of claim 3, wherein the FIFO buffer informs the second consumer that the overwritten data is invalid data.

5. The system-on-chip of claim 1, wherein the FIFO buffer requests that the data producer stops generating data.

6. The system-on-chip of claim 1, wherein the FIFO buffer comprises:

a memory which has an input port receiving data provided from the data producer and a plurality of output ports outputting data to the first and second consumers; and
FIFO control logic which generate the write pointer and the first and second read pointers and determines the status of the FIFO buffer related to the first and second consumers by referring to the write pointer and the first and second read pointers.

7. The system-on-chip of claim 6, wherein if the difference between the second read pointer and the write pointer corresponds to the size of the FIFO buffer and the difference between the first read pointer and the write pointer is less than a first threshold value, the FIFO control logic controls the memory to forcibly overwrite data from the data producer at a memory area corresponding to the second read pointer.

8. The system-on-chip of claim 7, wherein if the difference between the second read pointer and the write pointer corresponds to the size of the FIFO buffer and the difference between the first read pointer and the write pointer is more than a first threshold value and less than a second threshold value, the FIFO control logic generates a flag signal requesting a pop-out operation of the second consumer.

9. The system-on-chip of claim 6, wherein the FIFO control logic comprises:
a write pointer generator which generates a write pointer in response to data push from the data producer;
a first read pointer generator which generates a first read pointer in response to a pop-out request of the first consumer;
a second read pointer generator which generates a second read pointer in response to a pop-out request of the second consumer;
a status generator which decides a status of the memory in response to the write pointer and the first and second read pointers; and
a flag generator which transfers a flag to at least one of the data producer and the first and second consumers in response to a status of a multi-port memory output from the status generator.

10. An application processor comprising:
a data producer;
a FIFO buffer which sequentially stores data provided from the data producer;
a plurality of main consumers each of which pops out data stored at the FIFO buffer; and
a plurality of sub consumers each of which pops out data stored at the FIFO buffer and allows a pop-out delay,
wherein the FIFO buffer requests a pop-out operation on at least one of the sub consumers before data to be output to at least one of the main consumers is exhausted, wherein if the difference between a write pointer and at least one of read pointers each corresponding to the main consumers is more than the first threshold value and less than a second threshold value, the FIFO buffer provides at least one of the sub consumers with a flag signal requesting a pop-out operation.

11. The application processor of claim 10, wherein if the difference between a write pointer and at least one of read pointers each corresponding to the main consumers is less than a first threshold value, the FIFO buffer overwrites data pushed from the data producer at a data area not popped out by the sub consumers.

12. The application processor of claim 11, wherein the FIFO buffer informs at least one of the sub consumers that the overwritten data is invalid data.

13. The application processor of claim 11, wherein the FIFO buffer comprises:
a memory which writes data provided from the data producer at a write pointer and outputs according to read pointers each read pointer corresponding to main and sub consumers; and
FIFO control logic which determines a data status of the FIFO buffer referring to the write pointer and the read pointers.

14. The application processor of claim 13, wherein the FIFO control logic comprises:
a register which stores the first threshold value or the second threshold value;
a plurality of first comparators which compare differences of the write pointer and read pointers each corresponding to the main consumers with the first threshold value or the second threshold value and determine statuses of the FIFO buffer on the main consumers;
a plurality of second comparators which compare differences of the write pointer and read pointers each corresponding to the sub consumers with the first threshold value or the second threshold value and determine statuses of the FIFO buffer on the sub consumers; and
a sub consumer hurry generator which outputs a hurry flag directing data consumption to at least one of the sub consumers when at least one of the sub consumers is determined to be at a full status based on outputs of the first and second comparators and the difference between the write point and a read pointer corresponding to at least one of the main consumers is less than the second threshold value.

15. The application processor of claim 14, wherein the FIFO control logic comprises:
a producer hurry generator which requests data to be overwritten at a data area not popped out by the at least one sub consumer at the data producer when at least one of the sub consumers is determined to be at a full status based on outputs of the first and second comparators and the difference between the write point and a read pointer corresponding to at least one of the main consumers is less than the first threshold value.

16. The application processor of claim 15, wherein the FIFO control logic further comprises:
a dirty handler which informs the at least one sub consumer that the overwritten data is invalid.

17. A mobile device comprising:
a hardware codec which generates image data;
a FIFO buffer which has a circular buffer architecture and stores the image data at a memory location corresponding to a write pointer and outputs the stored data based on a first read pointer and a second read pointer;
a display controller which plays an image on a display using data popped out by the first read pointer; and
a direct memory access control unit which is provided with data popped out by the second read pointer, wherein, if a difference between the write pointer and the first read pointer is greater than the first threshold value and less than a second threshold value, the FIFO buffer requests that the direct memory access control unit pops data out.

18. The mobile device of claim 17, wherein if the difference between the write pointer and the first read pointer is less than a first threshold value, the FIFO buffer overwrites data pushed from the hardware codec regardless of a location of the second read pointer.

* * * * *